US012759915B2

(12) United States Patent
Hong

(10) Patent No.: US 12,759,915 B2
(45) Date of Patent: Oct. 13, 2026

(54) OSCILLATING BUBBLE REACTOR

(71) Applicant: University of Utah Research Foundation, Salt Lake City, UT (US)

(72) Inventor: Andy Hong, Salt Lake City, UT (US)

(73) Assignee: UNIVERSITY OF UTAH RESEARCH FOUNDATION, Salt Lake City, UT (US)

( * ) Notice: Subject to any disclaimer, the term of this patent is extended or adjusted under 35 U.S.C. 154(b) by 388 days.

(21) Appl. No.: 18/497,523

(22) Filed: Oct. 30, 2023

(65) Prior Publication Data

US 2024/0140840 A1 May 2, 2024

Related U.S. Application Data

(60) Provisional application No. 63/420,324, filed on Oct. 28, 2022.

(51) Int. Cl.

| | |
|---|---|
| ***C02F 1/78*** | (2023.01) |
| ***B01F 23/231*** | (2022.01) |
| ***B01F 23/237*** | (2022.01) |
| ***B01F 25/312*** | (2022.01) |
| *B01F 101/00* | (2022.01) |
| *C02F 101/36* | (2006.01) |

(52) U.S. Cl.

CPC ........ *C02F 1/78* (2013.01); *B01F 23/231265* (2022.01); *B01F 23/237613* (2022.01); *B01F 25/3121* (2022.01); *B01F 25/31233* (2022.01); *B01F 2101/305* (2022.01); *B01F 2215/0431* (2013.01); *C02F 2101/36* (2013.01); *C02F 2301/046* (2013.01); *C02F 2305/023* (2013.01)

(58) Field of Classification Search

None

See application file for complete search history.

(56) References Cited

U.S. PATENT DOCUMENTS

| | | | | |
|---|---|---|---|---|
| 2001/0003291 | A1* | 6/2001 | Uematsu | B01F 25/4316 366/175.2 |
| 2011/0241230 | A1* | 10/2011 | Kerfoot | B01D 24/10 261/37 |
| 2019/0241452 | A1* | 8/2019 | Ball | C02F 1/70 |
| 2021/0002157 | A1* | 1/2021 | Coakley | E21B 21/068 |

* cited by examiner

*Primary Examiner* — Richard C Gurtowski

(74) *Attorney, Agent, or Firm* — Thorpe North & Western LLC.

(57) ABSTRACT

An oscillating bubble reactor can include a stream inlet configured to receive a contaminated liquid stream, a reactant gas source, a serial venturi reactor (SVR), a micro-nano-bubble aerator (MNBA), and a treated stream outlet. The SVR can be connected downstream to the stream inlet and configured to receive the contaminated liquid stream. The SVR can include a set of serially connected constrictions alternating with pipe segments having a larger diameter than a smaller diameter of the constrictions. The MNBA can be in the stream inlet or the serial venturi reactor. The MNBA can be connected to the reactant gas source and configured to release reactant gas microbubbles, nanobubbles, or a combination thereof into the contaminated liquid stream from the reactant gas source. The treated stream outlet can be connected downstream to the serial venturi reactor.

22 Claims, 10 Drawing Sheets

FTLA Concentration / Size graph for Experiment:
Capture 2022-05-17 12-30-19

OSCILLATING BUBBLE REACTOR

CROSS REFERENCE TO RELATED APPLICATIONS

This application claims priority to U.S. Provisional Application No. 63/420,324, filed Oct. 28, 2022, which is incorporated herein by reference.

STATEMENT REGARDING FEDERALLY SPONSORED RESEARCH OR DEVELOPMENT

This invention was made with government support under grant R19AC00157 awarded by the Department of the Interior/Bureau of Reclamation. The government has certain rights in this invention.

NAMES OF THE PARTIES TO A JOINT RESEARCH AGREEMENT

Not applicable.

INCORPORATION BY REFERENCE STATEMENT

Not applicable.

BACKGROUND

Per- and poly-fluoroalkyl substances (PFAS) are a family of manufactured chemicals that have been used extensively in aqueous film-forming foam (AFFF). These compounds are highly water-soluble, persistent, and even bioaccumulative, with adverse health effects. PFAS have been discovered in soil and waters including groundwater, drinking water, and wastewater. PFAS are robust chemicals, hardly undergoing hydrolysis, photolysis, or biodegradation under typical environmental conditions. As such, they present a great challenge to remove.

SUMMARY

An oscillating bubble reactor can include a stream inlet configured to receive a contaminated liquid stream, a reactant gas source, a serial venturi reactor, a micro-nano-bubble aerator (MNBA), and a treated stream outlet. The serial venturi reactor (SVR) can be connected downstream to the stream inlet and configured to receive the contaminated liquid stream. The serial venturi reactor can include a set of serially connected constrictions alternating with pipe segments having a larger diameter than a smaller diameter of the constrictions. The MNBA can be in the stream inlet or the serial venturi reactor. The MNBA can be connected to the reactant gas source and configured to release reactant gas microbubbles, nanobubbles, or a combination thereof into the contaminated liquid stream from the reactant gas source. The treated stream outlet can be connected downstream to the serial venturi reactor. The SVR and MNBA can be serially connected and operated concertedly, or be separated and operated independently in various applications. For example, the SVR can be operated on its own driven by a slurry pump to break up soil aggregates. The MNBA can be operated on its own to aerate a waterbody with oxygen.

The present disclosure also describes decontamination systems. In one example, a decontamination system can include a contaminated liquid source and an oscillating bubble reactor connected to the contaminated liquid source and configured to treat the contaminated liquid. The oscillating bubble reactor can include a stream inlet configured to receive a contaminated liquid stream from the contaminated liquid source, a reactant gas source, a serial venturi reactor, a micro-nano-bubble aerator (MNBA), and a treated stream outlet. The serial venturi reactor can be connected downstream to the stream inlet and configured to receive the contaminated liquid stream. The serial venturi reactor can include a set of serially connected constrictions alternating with pipe segments having a larger diameter than a smaller diameter of the constrictions. The MNBA can be in the stream inlet or the serial venturi reactor, connected to the reactant gas source, and configured to release reactant gas microbubbles, nanobubbles, or a combination thereof into the contaminated liquid stream from the reactant gas source. The treated stream outlet can be connected downstream to the serial venturi reactor. The contaminated liquid source can be a wastewater source, groundwater, water mixed with contaminated soil, or a water tank of a firefighting vehicle.

The present disclosure also describes methods of decontaminating contaminated liquid streams. In one example, a method of decontaminating a contaminated liquid stream can include forming reactant gas microbubbles, nanobubbles, or a combination thereof in a contaminated liquid stream. The reactant gas can react with a contaminant in the contaminated liquid stream. The contaminated liquid stream and reactant gas microbubbles or nanobubbles can flow through a serial venturi reactor. The serial venturi reactor can include a set of serially connected constrictions alternating with pipe segments having a larger diameter than a smaller diameter of the constrictions such that the reactant gas microbubbles or nanobubbles expand due to lower relative pressure in the constrictions and contract due to higher relative pressure in the pipe segments having a larger diameter (per Bernoulli principle of higher velocity at lower pressure through constricted passage and lower velocity at higher pressure through spacious passage). A treated stream can be recovered from the serial venturi reactor, wherein the treated stream has a reduced concentration of the contaminant.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
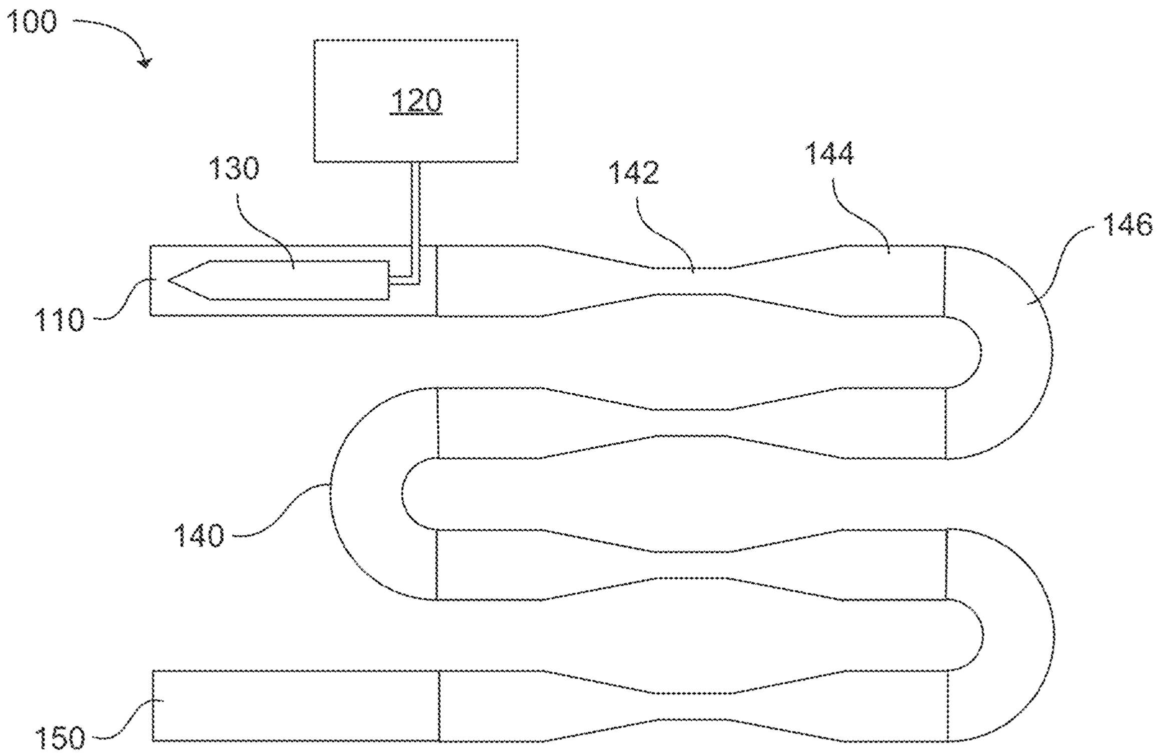
FIG. 1 is a schematic view of an example oscillating bubble reactor in accordance with the present disclosure.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

The use of the terms "a," "an," "the," and similar referents in the context of describing the elements (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally, the phrase "consisting essentially of" will be understood to include those elements specifically recited and those additional elements that do not materially affect the basic and novel characteristics of the claimed invention. The phrase "consisting of" excludes any element not specifically specified.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

Oscillating Bubble Reactors

The technology described herein provides oscillating bubble reactors, systems, and methods for treating PFAS-contaminated water and soil. The oscillating bubble reactors can include a micro-nano-bubble aerator (MNBA) in conjunction with a serial venturi reactor (SVR) system to eliminate PFAS in a technically advanced, efficient, effective, sustainable, and cost-effective manner. These reactors can provide an effective, feasible, and sustainable treatment technology for PFAS-contaminated waters and soils. The reactors, systems, and methods can achieve complete mineralization of PFAS in a single process in a contained reactor. Depending on the application, the SVR and MNBA can be used independently. For example, the SVR can be operated on its own driven by a slurry pump to break up soil aggregates. Similarly, the MNBA can be operated on its own to aerate a waterbody with oxygen.

The technology described herein can involve the creation of $O_2\cdot^-$ and OH· (two reactive oxygen species (ROS)) at the interface of micro/nanobubbles (MNB), which are directed to flow and oscillate in a closed-loop tubular reactor to degrade PFAS until their complete removal. The technology makes uses the MNBA-SVR system to carry out treatment. The $O_2\cdot^-$/OH· pair acts concertedly to alternately attack the recalcitrant C—F bonds leading to chain shortenings and eventual mineralization of PFAS. The technology utilizes: 1) the energy-efficient MNBA to generate long-living micro/nanobubbles to provide increased reaction time; 2) abundant, agitated micro/nanobubble interface that accumulates PFAS and accelerates elimination kinetics; 3) compression-decompression cycles afforded by the novel serial venturi reactor to break up soil aggregates to effect increased PFAS exposure, and 4) closed-loop, one-step process that eliminates often complex multi-steps with multiple media in treatment train approaches that risk secondary adverse environmental impacts.

In some examples, the oscillating bubble reactors, systems, and methods can be used in applications such as: PFAS elimination for remediation of groundwater and soil impacted by substances in firefighting aqueous film-forming foam (AFFF); treatment of rinse water in decommissioning and cleaning of fire-fighting vehicles containing AFFF or replacement of AFFF agents in them; and remediation of other organic contaminants in water and soil.

Per- and poly-fluoroalkyl substances (PFAS) are a family of manufactured chemicals that have been produced and used as components of surfactants, waxes, fluids, polymers and other materials. PFAS such as perfluorooctane sulfonate (PFOS) used in aqueous film-forming foam (AFFF) are highly water-soluble, persistent, and some may be bioaccumulative. Toxicological evidences suggest that sufficiently high dose levels may result in cancer, liver damage, high cholesterol, endocrine disruption, and immune suppression. High concentrations of PFAS have been discovered in groundwater, drinking water, and wastewater, with significant potential to impact drinking water systems (including smaller utilities serving <10,000 individuals), private wells, and agricultural operations. PFOS and byproduct perfluorooctanoate (PFOA) are robust chemicals; they do not undergo hydrolysis, photolysis, or biodegradation under typical environmental conditions, and present a great challenge to remove. Conventional approaches such as air stripping, thermal treatment, soil vapor extraction, and some hydroxyl radical-based process (i.e. advanced oxidation process, AOP) are not effective for their removal. Granular Activated carbon (GAC) adsorption followed by incineration of the spent GAC is well established and common. However, none have offered to date to remove PFAS both effectively and economically.

A wide variety of technologies to remove or destroy PFAS has been tested by researchers and practitioners. They include sorption, ion exchange, advanced oxidation processes (AOP), electrochemical oxidation, photolysis, photocatalysis, advanced reduction processes using aqueous iodide or dithionite and sulfite, thermal and nonthermal destruction, incineration, sonochemical degradation, sub- or supercritical treatment, microwave hydrothermal treatment, high-voltage electric discharge, microbial treatment, and others. These processes are typically employed in combination in multiple steps or units, often requiring multiple media between which PFAS transfer. While AOP and advanced reduction processes (ARP) destroy PFAS effectively in the laboratory, they have not demonstrated effectiveness under field conditions to achieve low target levels such as 70 ng/L or lower.

Some chemical oxidation technologies have been used for PFAS degradation, including Fenton reagent ($Fe(II)/H_2O_2$), $O_3$, $O_3/H_2O_2$, $MnO_4^-$, and photochemical/heat-activated persulfate ($S_2O_8^{2-}$) (Dombrowski et al., 2018). Among these processes, reactive oxygen species (ROS) that include superoxide radical anion ($O_2\cdot^-$), hydroxyl radical (OH·), and hydroperoxide anion ($HO_2^-$) have been used. However, a reactor generating only OH' shows no reactions with PFOA.

The present technology provides reactors that can be used to treat contaminated liquid streams, including streams that contain PFAS. The reactors described herein can utilize oscillating bubbles of a reactant gas. Without being bound to a particular mechanism, in some cases the reactant gas can include ozone ($O_3$) and the ozone can react to form both $O_2\cdot^-$ and $OH^-$ When $O_2\cdot^-$ and OH· are present together, they can rapidly degrade PFOA. The technology described herein can include a micro-nano-bubble aerator (MNBA) and serial venturi reactor (SVR) that can provide oscillating bubbles of ozone. These micro- or nano-bubbles can provide particularly efficient reaction conditions to drive rapid degradation of PFAS via concerted reductive-oxidative degradations of PFAS. The reactors described herein can also be used with a variety of other reactant gases to treat a variety of other substances in addition to PFAS.

While large gas bubbles (e.g. >65 μm) in water rise, expand, and disappear from the water column once reaching the water surface (according to Stoke's equation: $U=\rho g d^2/18\mu$ where U, ρ, g, d, μ are rising velocity, gravitational acceleration constant, diameter, and viscosity, respectively), small bubbles rise very slowly (e.g. 20 cm/h at 10-μm size) in water enabling prolonged gas transfer into water that leads to bubble contraction. The contraction is due to very high internal pressure of the bubble (Laplace pressure $P=2\sigma/r$ where σ is water surface tension and r the bubble radius) that arises from water surface tension at small bubble sizes (e.g. 3.9 atm at 1 μm; 30 atm at 0.1 μm). The high internal gas pressure corresponds to a high concentration gradient (i.e. C*—C, where C* is the equilibrium concentration corresponding to the bubble pressure by Henry's Law and C the dissolved gas concentration) resulting in a great driving force in mass transfer as governed by $K_La(C^*—C)$ (where $K_La$ is the overall mass transfer coefficient). This leads to a high gas transfer rate into water and thus the bubble's contraction. Once in submicron range (i.e. nano sizes), the gas bubbles become even more stable over days and weeks or longer because of the negative charge of OH— ions accumulated at the interface. The abundant interface attracts and concentrates surfactant molecules such as PFAS for increased exposure to the reactive species ($O_2^{\cdot-}$ and OH·) generated at the same interface of the gas bubbles, thus resulting in efficient degradation there. It should be noted that air-water interfacial adsorption of PFOA and PFOS is significant, estimated to account for 50% of retardation in groundwater transport of PFAS.

With this description in mind, in one example an oscillating bubble reactor can include a stream inlet configured to receive a contaminated liquid stream. A serial venturi reactor can be connected downstream to the stream inlet and configured to receive the contaminated liquid stream. The serial venturi reactor can include a set of serially connected constrictions alternating with pipe segments having a larger diameter than a smaller diameter of the constrictions. A micro-nano-bubble aerator (MNBA) can be positioned in the stream inlet or in the serial venturi reactor. The MNBA can be connected to a reactant gas source and configured to release reactant gas microbubbles and/or nanobubbles into the contaminated liquid stream. The oscillating bubble reactor can also include a treated stream outlet connected downstream to the serial venturi reactor.

FIG. 1 is a schematic view of one example oscillating bubble reactor 100. The reactor includes a stream inlet 110 that can receive a contaminated liquid stream. A reactant gas source 120 is connected to a micro-nano-bubble aerator 130. In this example, the MNBA is positioned in the stream inlet. The MNBA can aerate the contaminated liquid stream with microbubbles or nanobubbles of the reactant gas. In some examples, the reactant gas can be reactive with a contaminant in the contaminated liquid stream. A serial venturi reactor 140 is connected downstream to the stream inlet. In this example, the MNBA is upstream of the SVR. The SVR includes a set of serially connected constrictions 142 alternating with pipe segments 144 having a larger diameter than the smaller diameter of the constrictions. The constrictions act as venturi throats. When liquid flows through the SVR, the liquid has a higher pressure in the larger diameter pipe segments and a lower pressure in the constrictions. This causes bubbles in the liquid to expand in the lower pressure portions and to contract in the higher pressure portions. This repeated expanding and contracting of bubbles can help increase reaction rates and break up soil or other particles in the contaminated stream. In this example, the SVR includes four constrictions. However, in other examples, the SVR can include any number of constrictions, such as 5 to 20, 5 to 10, or 10 to 20 constrictions. In this example, the SVR includes straight venturi sections connected by elbow segments 146. Downstream of the SVR there is a treated stream outlet 150. The liquid stream, which has been treated by introduction of bubbles of reactant gas and repeated pressurizing and depressurization in the SVR, can exit through this outlet. The cross-sectional shapes of the venturi constrictions, pipe segments, and elbow segments are shown in this figure. These components can have a cylindrical or conical shape in three dimensions. For example, the segments that have a uniform diameter along a given length can be cylindrical, while the segments that have an increasing or decreasing diameter can be conical.

Figure 2:
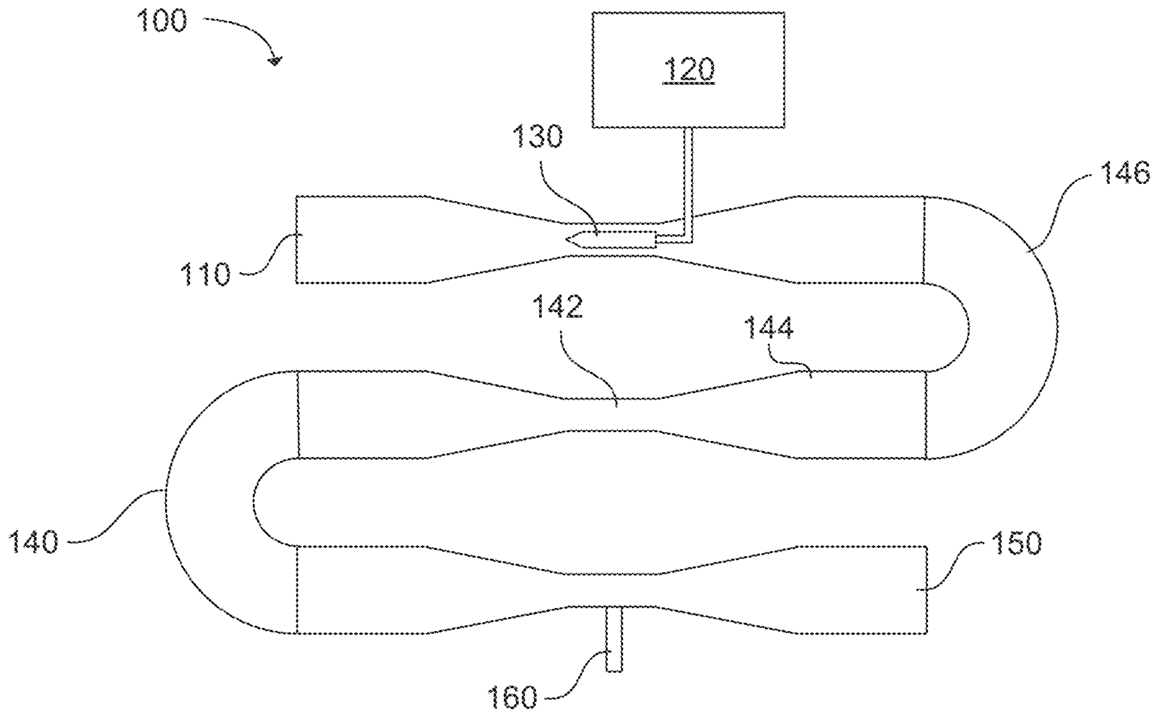
FIG. 2 is a schematic view of another example oscillating bubble reactor in accordance with the present disclosure.

FIG. 2 shows a different example oscillating bubble reactor 100. In this example, the stream inlet 110 is also the inlet into the SVR 140. Instead of being positioned upstream of the SVR, in this example the MNBA 130 is positioned in the SVR. In particular, the MNBA is positioned in one of the constrictions 142 of the SVR. As in the previous examples, the SVR includes a series of constrictions separated by pipe segments 144 that have a larger diameter than the constrictions. These are serially connected by elbow segments 146 so that the contaminated liquid stream is repeatedly pressurized and depressurized. The MNBA is connected to a reactant gas source 120. The MNBA release microbubbles or nanobubbles of reactant gas into the contaminated liquid stream in the first constriction of the SVR. The pressure of the contaminated liquid stream can be lower in the constriction than in the larger diameter segments. Therefore, the bubbles formed by the MNBA in the constriction can shrink even smaller when the liquid is pressurized to a higher pressure in the larger diameter segments. This example also includes an additional reactant inlet 160 connected to another constriction of the SVR. This reactant inlet can be used to introduce another reactant into the stream. The treated stream outlet 150 is also the outlet of the SVR in this example.

Figure 3:
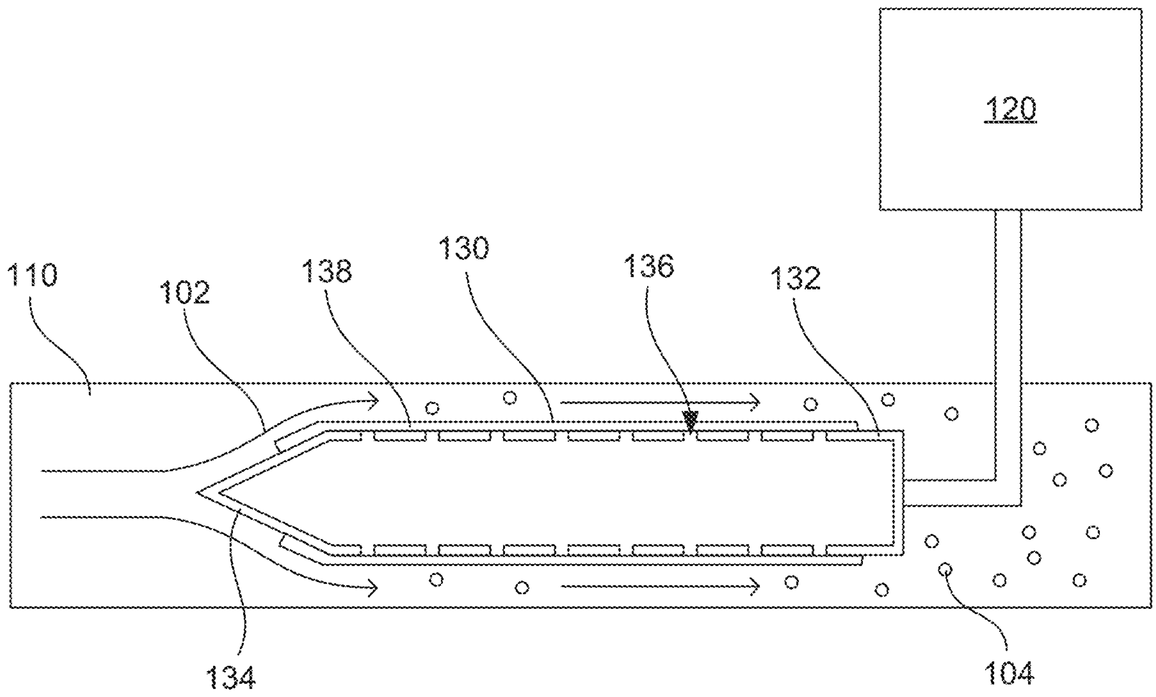
FIG. 3 is a schematic view of an example micro-nano-bubble aerator (MNBA) in accordance with the present disclosure.

An example of the MNBA is illustrated in further detail in FIG. 3. This figure shows a cross-sectional view of a micro-nano-bubble aerator 130 positioned in a stream inlet 110. In this example, the stream inlet is a pipe segment, and the MNBA is positioned inside the pipe segment. The MNBA includes an aerator body 132 with a conical upstream end 134 and a plurality of perforations 136 in fluid communication with a reactant gas source 120. The MNBA also includes a hydrophobic membrane sleeve 138 around the aerator body. The hydrophobic membrane sleeve is porous to allow reactant gas to pass through the membrane into a liquid stream flowing through the pipe as growing gas bubbles form on the liquid side of the membrane which then slough off the membrane into the liquid stream as small bubbles. In some examples, the liquid can flow around the MNBA by laminar flow, as indicated by the flow arrows 102 shown in this figure.

The aerator body can be made of stainless steel, ceramic, inert plastics such as PTFE, PEEK, HDPE, or polycarbonate, or combinations thereof. The aerator body can be hollow, having a shell made of these materials and a hollow annular space for the reactant gas to flow through. As in the example above, the MNBA can also include a hydrophobic membrane sleeve around the aerator body. The hydrophobic membrane sleeve can be made of polytetrafluoroethylene, polypropylene, polyethylene, ethylene-propylene copolymers, PEEK, HDPE, polycarbonate, or combinations thereof that are resistant to the reactant gases. The hydrophobic membrane can have pores that can vary in size based on intended fluid flows and performance. In some examples, the average pore size can range from 5 μm to 30 μm. The pore size may not correlate with generated bubble sizes, as the bubble size can be affected more by the membrane hydrophobicity/hydrophilicity and the hydrodynamic conditions such as gas and liquid flow velocities.

In certain examples, the MNBA can be fabricated as a fine stainless-steel diffuser cladded in a hydrophobic, porous PTFE membrane sleeve. In other words, the aerator body can be made of stainless steel with fine perforations to allow reactant gas to flow out through the membrane to form microbubbles or nanobubbles. Non-limiting examples of suitable materials for forming the aerator body can include stainless steel, titanium, HDPE, CPVC, PEX, Kynar, polycarbonate, fluoroelastomers (e.g. VITON), and ethylene acrylic elastomers (e.g. VAMAC), polytetrafluoroethylene (e.g. TEFLON), polyethylene, polypropylene, fluorinated ethylene propylene, perfluoroalkoxy alkane, ethylene tetrafluoroethylene (ETFE), polyvinylidene fluoride (PVDF), polypropylene (PP), polystyrene (PS), polyethylene (PE), polycarbonate (PC), polyurethane (PU), polyvinyl chloride (PVC), polyethylene terephthalate (PET), polymethyl methacrylate (PMMA), ethylene-propylene, high density polyethylene (HDPE), composites thereof, and combinations thereof. The conical upstream end, or head, of the MNBA can be placed pointing toward oncoming liquid flow. The growth of gas bubbles and the size of the bubbles when they separate from the MNBA can be affected by the following parameters: hydrophobicity or hydrophilicity of the aerator's membrane surface, pore size and surface roughness of the membrane, gas pressure of the aerator, and water velocity. These can affect the contact angle and height of the bubble, shear force experienced by the emerging bubbles, and growth rate of the bubbles. To create the bubble sizes from 10 nm to 100 μm for contaminant treatment, the desired treatment throughput can be considered to determine the appropriate pipe size, pump capacity, and flow velocity in the aerator tube. Then an optimal gas flow rate can be selected to percolate through the hydrophobic membrane and to be compatible with the liquid flow velocity in order to generate the desirable bubble sizes. These operation conditions can be selected to create desired bubble sizes, such as in the range of 10 nm to 100 μm, that will shrink further into nano sizes and become stable and provide abundant reactive zones. It should be noted that water flow along the diffuser segment of the water pipe is constricted because of the diffuser's placement, causing it to behave as a venturi, i.e. decreased pressure at this constricted zone (i.e. venturi throat) that draws gas into the water flow through the diffuser body as governed by the Bernoulli equation.

Figure 4:
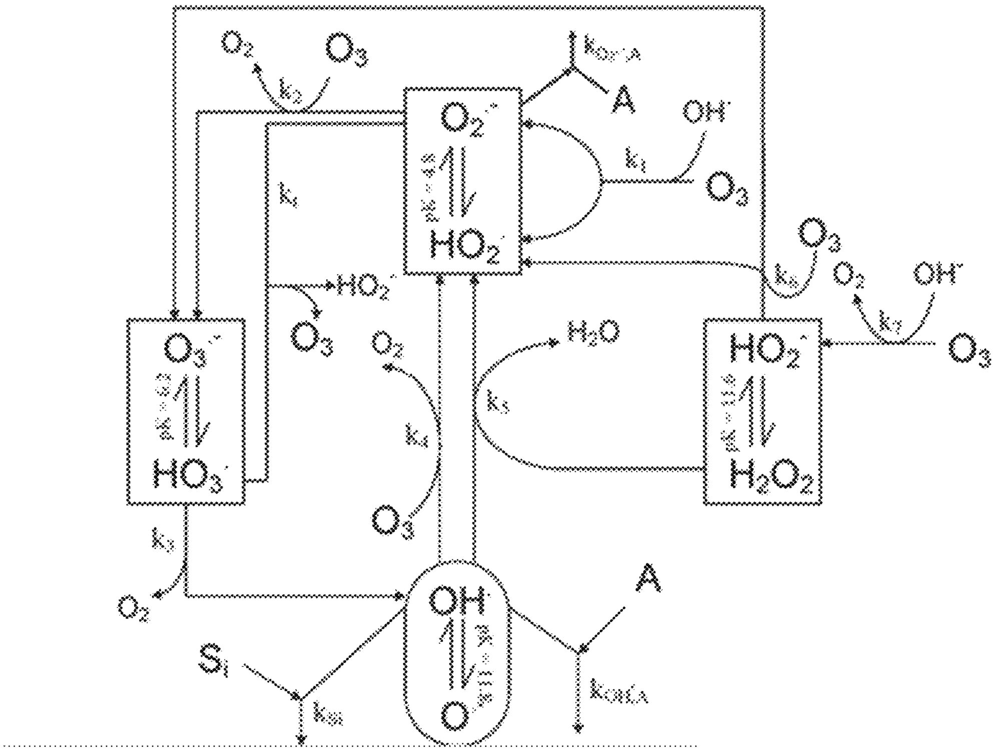
FIG. 4 is a reaction schema illustrating the free radical reaction network of ozone in water.

When $O_3$ is introduced through the MNBA to exist as micro/nanobubbles, reactive $O_2{\cdot}^-$ and OH· are created, along with other species capable of both reductive and oxidative reactions at the interface where PFAS surfactants aggregate, leading to heightened PFAS degradation. FIG. 4 shows a schema of chemical reactions that can occur with ozone in water. The rate constants of all of these reactions are known. While OH· radical is among the most potent oxidants known, $O_2{\cdot}^-$ and $O_3{\cdot}^-$ are effective reductants, thus enabling the full redox suite capable of working concertedly for contaminant degradation.

Figure 5:
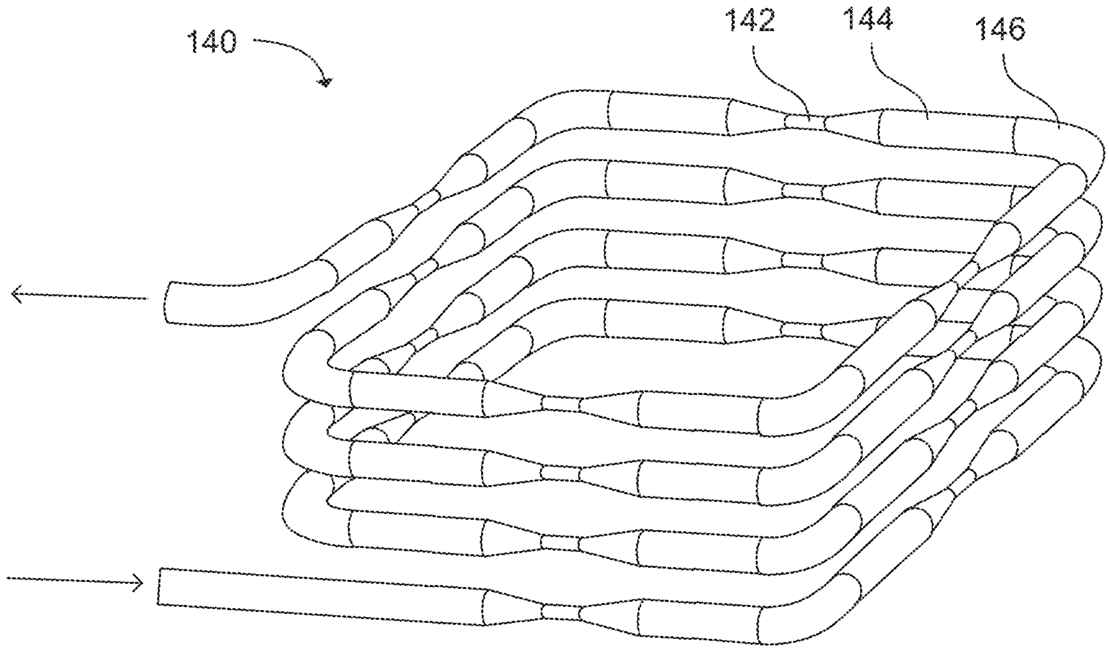
FIG. 5 is a perspective view of an example serial venturi reactor (SVR) in accordance with the present disclosure.

The SVR apparatus described herein can be used as a reactor for PFAS elimination from waters and soils in some examples. In one example, the SVR can be a tubular flow reactor in a rounding, planar, stacked configuration, with repeating venturi sections along the flow path. As one example, the SVR can have a stacked quadrilateral shape as shown in FIG. 5. This figure shows an SVR 140 that includes 16 constrictions 142 separated by pipe segments 144 with a larger diameter. These venturi sections are arranged in a quadrilateral shape, with 90-degree elbow segments 146 at the corners. The quadrilaterals are connected as a coil of stacked quadrilaterals. The MNBA (not shown in this figure) can be installed at the SVR inlet to introduce micro/nanobubbles with $O_3$ into the reactor's flowing water. The bubbles oscillate in size as they pass through repeating venturi sections along the reactor flow path, i.e. the interfacial area of the bubbles expands when passing through the constricting sections, and contracts when passing through the diverging zones.

Figure 6:
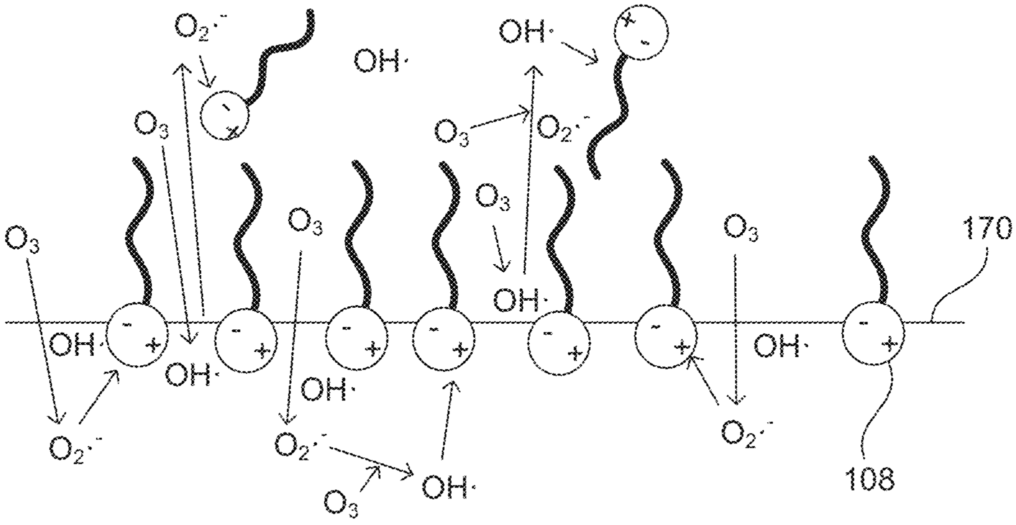
FIG. 6 is a schematic view of an interface between a gas bubble and water in accordance with the present disclosure.
Figure 7:
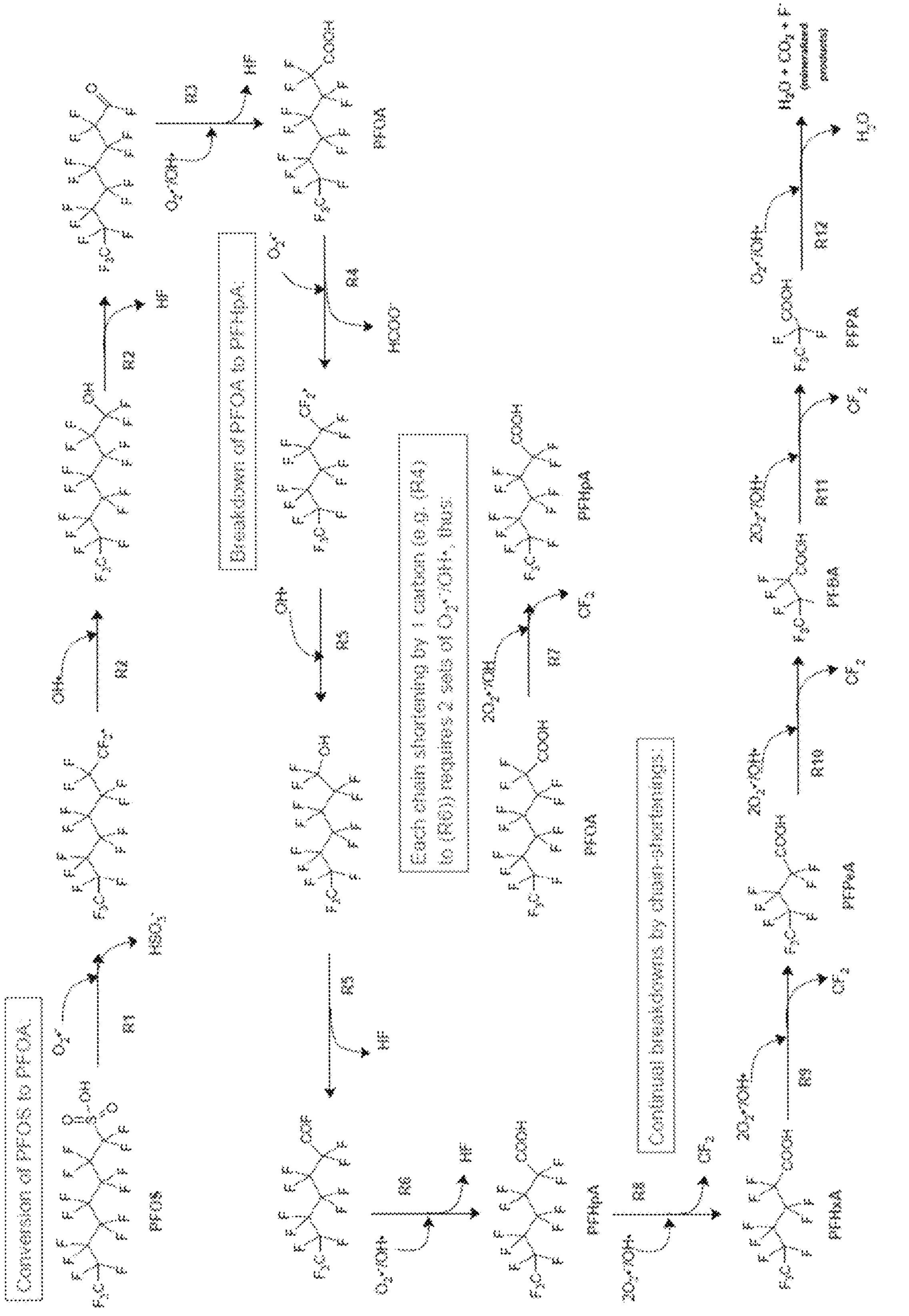
FIG. 7 is a reaction schema illustrating degradation reactions of polyfluoroalkyl substances (PFAS) in accordance with the present disclosure.

The constrictions can have a smaller cross-sectional area compared to the pipe segments between the constrictions. With this smaller cross-sectional area, liquid is forced to flow at a higher velocity through the constrictions compared to the pipe segments with a larger cross-sectional area. In some examples, the venturi constrictions can be formed as narrow portions of the pipe. In other examples, the venturi constrictions can be sections of the pipe that have a reduced cross-sectional area by any means, such as by placing objects or features inside the pipe to reduce the cross-sectional area available for water flow. The oscillation of a large number of small bubbles with very large interfacial area agitates and heightens contact between the gaseous ozone molecules and the water molecules at the interface (e.g. $OH^-$), which creates $O_2{\cdot}^-$ and OH· at the interface in close proximity to where the surfactant molecules of PFAS concentrate. FIG. 6 shows a schematic representation of a gas-liquid interface 170 of an ozone bubble in water and reactions that can occur with PFAS 108 near the gas-liquid interface. The PFAS molecules have a polar head and non-polar tail, which causes the PFAS molecules to accumulated at the gas-liquid interface. A small number of PFAS molecules can travel into the gas phase. The ozone molecules can react with water to form $O_2{\cdot}^-$ and OH·. The $O_2{\cdot}^-$ can attach PFAS molecules as a reducing agent, and the OH· can attack PFAS molecules as an oxidizing agent. The interfacial oscillation leads to heightened destruction of PFAS compounds by the $O_2{\cdot}^-$/OH· radicals. Some specific examples of reactions that can occur to break down PFAS include reactions R1 through R13 as shown in FIG. 7. In some examples, multiple reactor coils can be linked to increase reactor length and thus the contraction/expansion cycles as needed while occupying minimal space, as larger tube sizes can be used to increase volume and processing capacity.

Figure 8A:
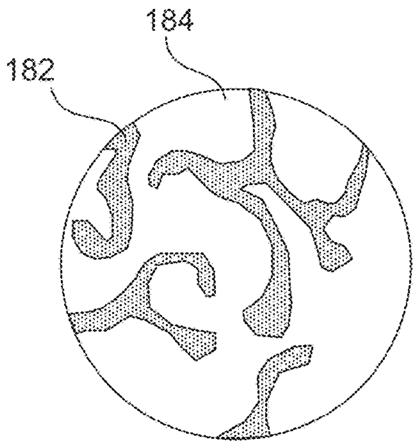
FIGS. 8A-8D show a soil fracturing processes in accordance with the present disclosure.
Figure 8B:
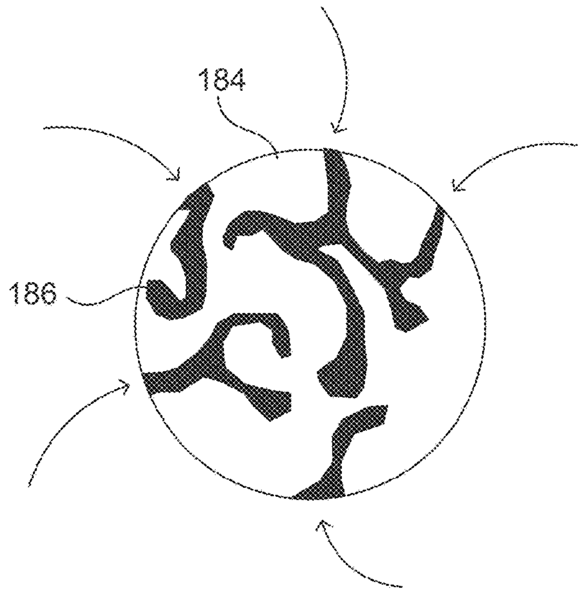
Figure 8C:
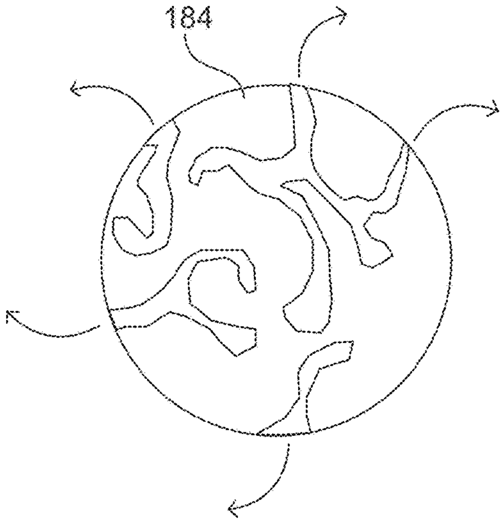
Figure 8D:
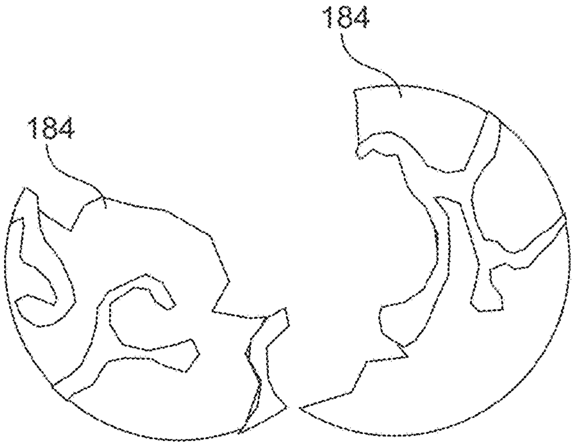

The reactors described herein can be particularly useful for treating contaminated soil and water that contains soil, such as groundwater. Waters and solids that can be treated included groundwater, surface waters, industrial effluents, soil, sediment, algal biomass, municipal biosolids, etc. Rapid exposure of contaminants in soil aggregates is made possible by fracturing the soil aggregates (or particles) using successive cycles of compression and decompression with the bubbles of reactant gas. As illustrated in FIG. 8A, the pore space 182 of the soil aggregates 184 can be initially filled or partially filled with groundwater. Increasing pore liquid replacement by air occurs during successive pressure cycles that results in an increasingly 'hollow' soil aggregate. FIG. 8B shows the soil aggregate under high pressure. Liquid 186 carrying dissolved air and ozone enters the pores. Once the ozone is in the pore, it can react with contaminants in the pores. The when pressure is reduced, gas formation occurs within the pores. This gas can expel reaction products and contaminants from the pores, as shown in FIG. 8C. The hollow soil aggregate has pressure exerted on it as long as the water cannot be transported through the pore space fast enough to equilibrate against the pressure differential during rapid compression or decompression, i.e., traveling through the diverging and constricting zones of the venturi, respectively. When the pressure tolerance of the wall is exceeded, breakage of the soil aggregate occurs by implosion or explosion, as shown in FIG. 8D, leading to increased exposure of the contaminants to the bulk liquid phase. Thus, the mechanisms at work for increased exposure include flushing, implosion, and explosion caused by repeated pressure cycles.

In the examples described above, ozone is utilized as the reactant gas. Ozone can be useful for decontaminating a variety of materials, and can be especially useful for breaking down PFAS. In other examples, different reactant gases can be used. For example, the reactant gas can include ozone, air, oxygen, carbon dioxide, hydrogen, methane, combinations thereof, or other gases in some cases. In further examples, the reactant gas source can be a source of ozone, air, oxygen, carbon dioxide, hydrogen, methane, or a combination thereof.

In one example, the reactant gas source can be an ozone generator connected to an air source. The air source can simply be ambient air in some cases. The ozone generator can be used to generate pure ozone or ozone-enriched air. The ozone or ozone-enriched air can then be introduced through the MNBA as reactant gas bubbles. In some examples, the ozone generator can supply ozone-enriched air with an ozone concentration at any suitable concentration for a given application. However, as a very general guideline, concentrations can be used from about 0.001 ppm to about 20 wt %, or from about 0.005 ppm to about 20 wt %, or from about 0.01 ppm to about 20 wt %, or from about 1 ppm to about 20 wt %, or from about 100 ppm to about 20 wt %, or from about 1 wt % to about 20 wt %, or from about 1 wt % to about 5 wt %, or from about 1 wt % to about 3 wt %, or from about 100 ppm to about 3 wt %. [

The SVR can include multiple venturi constrictions connected in serial along the length of the SVR. The number of constrictions in the serial venturi reactor can vary depending on target performance metrics, but as a general guideline can be from 5 to 100, although as many as desired can be used when the reactor length is increased and as the distance between the constrictions is shortened. In some examples, the number of constrictions can be 8 to 20. A ratio of the diameter of the larger diameter of the pipe segments between the constrictions to the smaller diameter of the constrictions can be from about 1.1 to about 5, and in some cases from 2 to 5. In some examples, the larger diameter can be from about 0.5 inches to about 6 inches, and the smaller diameter can be from about 0.3 inch to about 5 inches. The varied ratios can achieve desired pressure differentials between the large and small diameters (i.e., higher pressure at the larger diameter and lower pressure at the smaller diameter according to the Bernoulli equation). The ratio differential can vary along the length of the reactor, or can be consistent across each constriction. Regardless, bubble oscillation provides agitation and heightens contact between the reactive gas in the bubbles and targeted contaminants attracted to the gas-liquid interface.

Furthermore, cavitation in the liquid can be induced or avoided at an appropriate range of large-to-small diameter ratio. In some cases, cavitation can be desirable to produce reactive free radicals. Therefore, bubble cavitation and collapse that result in formation of reactive free radicals can be induced or avoided using appropriate diameter ratios.

The flowrate of the liquid through the SVR can also vary depending on several factors. The flowrate can affect the formation of bubbles by the MNBA. Therefore, the flowrate can be selected to provide a desired bubble size. The flowrate can also be selected to provide a desired throughput. In some examples, the flowrate can be selected so that the liquid flows in the laminar regime within the larger diameter pipe segments, or the constrictions, or both. In other examples, the liquid can flow in a turbulent regime. The Reynold's number of the SVR can be 2,000 or less in some examples, or 1,100 or less in other examples, or 2,000 or more in further examples. Depending on the size of the reactor, the flow rate of liquid through the reactor can be from about 100 mL/min to about 10,000 L/min, or from about 100 mL/min to about 1,000 L/min, or from about 100 mL/min to about 10 L/min.

The serial venturi reactor can have a reactor length along a flow pathway from a first constriction to a last constriction, where the reactor length can be designed according to processing needs, e.g., from about 10 feet to about 150 feet. In some cases, the serial venturi reactor can include elbows between the constrictions and the serial venturi reactor can have the form of stacked quadrilateral loops. Other arrangements can also be used. In some examples, the SVR can be substantially straight, without any elbow joints or other bends between the venturi sections. In further examples, the SVR can have a zigzag shape with 180-degree elbow joints between venturi sections as shown in FIG. 1.

As mentioned above, in some examples the serial venturi reactor can also include one or more reactant inlets to allow other reactants to be introduced into the liquid flow in the reactor. In some examples, the reactant inlet can be connected to a constriction, so that the additional reactant is introduced into a constricted section of the reactor. Additional, non-limiting examples of reactants that can be introduced include gases, solids, or liquid treatment agents such as hydrogen peroxide, $Cl_2$, $O_2$, $H_2O_2$, $KMnO_4$, $FeCl_3$, $Al_2O_3$, $HCl/Ca(OH)_2$, and $H_2O_2$ can be added to achieve disinfection, increase dissolved gas concentration, promote flocculation, adjust pH, or favor OH radical concentration dependent upon various auxiliary process aims. In certain examples, at least one reactant inlet can be connected to a hydrogen peroxide source.

In some examples the MNBA can include a cylindrical, finely porous stainless-steel aerator with a pointed conical head inserted into a hydrophobic porous PTFE membrane sleeve. In further examples, the MNBA can be installed in a stainless-steel pipe, and the assembly can be attached to a serial venturi reactor. The assembly can act as a venturi with its throat at the constricted zone where the MNBA-displaced volume is located. Water flow accelerates through the throat, creating a low-pressure zone to draw the reactant gas, such as an $O_3$/air mixture, into the flowing water through the MNBA. Control parameters that can affect the bubble size distribution include: lengths of the MNBA and the pipe in which it is place, length ratios of the MNBA to the pipe, diameters of the MNBA and the pipe, and diameter ratios of the MNBA and pipe, aerator surface roughness, inlet pressure (negative to positive) of the MNBA, and water flow velocity.

The present disclosure also describes decontamination systems that can include the oscillating bubble reactors described above. In some examples, a decontamination system can include a contaminated liquid source and an oscillating bubble reactor connected to the contaminated liquid source. The oscillating bubble reactor can be configured to treat the contaminated liquid. The oscillating bubble reactor can include a stream inlet configured to receive a contaminated liquid stream from the contaminated liquid source. The oscillating bubble reactor can also include a reactant gas source. The oscillating bubble reactor can further include a serial venturi reactor connected downstream of the stream inlet and configured to receive the contaminated liquid stream. The serial venturi reactor can include a set of serially connected constrictions alternating with pipe segments having a larger diameter than a smaller diameter of the constrictions. A micro-nano-bubble aerator can be positioned in the stream inlet or in the serial venturi reactor. The MNBA can be connected to the reactant gas source and configured to release reactant gas microbubbles, nanobubbles, or a combination thereof into the contaminated liquid stream from the reactant gas source. A treated stream outlet can be connected downstream to the serial venturi reactor. In various examples, the contaminated liquid source can include a wastewater source, groundwater, water mixed with contaminated soil, or a water tank of a firefighting vehicle. In some examples, the system can also include a treated liquid holding tank connected downstream to the treated stream outlet.

The system can also include a treated liquid holding tank connected downstream to the treated stream outlet. In some examples, the treated liquid holding tank can include a vent with a carbon filter to filter vented gas. The system can also include a recycle stream from the treated liquid holding tank to the oscillating bubble reactor or to the contaminated liquid source. The recycle stream can recycle treated liquid to a location in the oscillating bubbles reactor upstream of the MNBA. In further examples, the reactant gas source can be a source of ozone, air, oxygen, hydrogen, methane, carbon dioxide, or a combination thereof. In one example, the reactant gas source can be an ozone generator connected to an air source. The number of constrictions in the serial venturi reactor can be from 5 to 50. A ratio of the larger diameter to the smaller diameter can be from about 1.3 to about 8, and in some cases up to about 3. In some examples, the larger diameter pipe section can be from about 2 inches to about 8 inches, and the smaller diameter pipe section can be from about 0.5 inches to about 6 inches. The serial venturi reactor can have a reactor length along a flow pathway from a first constriction to a last constriction, where the reactor length is from about 10 feet to about 150 feet. The serial venturi reactor can include elbows between the constrictions and the serial venturi reactor can have the form of stacked quadrilateral loops. In further examples, the serial venturi reactor can also include one or more reactant inlets connected to one or more of the constrictions. In some examples, at least one reactant inlet can be connected to a hydrogen peroxide solution source. In another example, the MNBA can be positioned in a venturi constriction of the serial venturi reactor. In yet another example, the MNBA can be positioned upstream of a venturi constriction of the serial venturi reactor. The MNBA can include an aerator body having a conical upstream end and a plurality of perforations in fluid communication with the reactant gas source. The aerator body can be made of stainless steel, ceramic, inert plastics such as PTFE, PEEK, HDPE, or polycarbonate, or combinations thereof. The MNBA can also include a hydrophobic membrane sleeve around the aerator body. In some examples, the hydrophobic membrane sleeve can be made of polytetrafluoroethylene, polypropylene, polyetheretherketone, polyethylene, HDPE, polycarbonate, or combinations thereof. The hydrophobic membrane can have pores with an average pore size from 5 to 30 μm.

Figure 9:
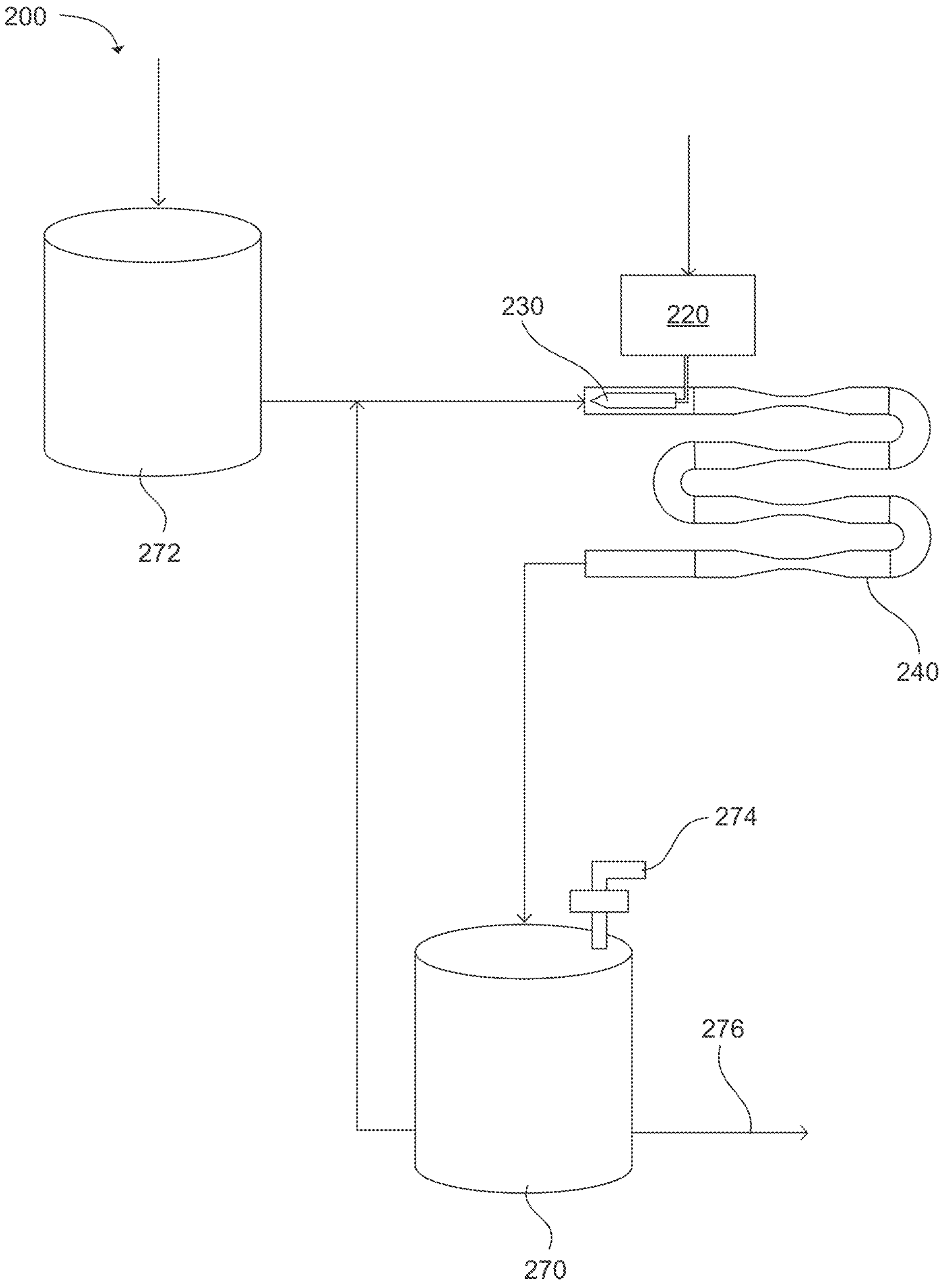
FIG. 9 is a schematic view of an example decontamination system in accordance with the present disclosure.

In one example, a decontamination system can be used to treat water impacted by PFAS. To treat the impacted water, an $O_3$/air source can be fed to the MNBA before the entrance of SVR. A water pump can drive the impacted water through the MNBA-SVR system and continually recirculate the water between the SVR and a holding tank, adding $O_3/H_2O_2$ intermittently as needed until a prescribed treatment level is completed. FIG. 9 shows an example decontamination system 200 that includes a holding tank 270, where the system is configured to recirculate treated water from the holding tank back through the SVR 240. When suitable flowrates and recirculation times are used, treatment of PFAS-spiked and PFAS-contaminated waters with $O_3$ and $H_2O_2$ can be accomplished. The system shown in FIG. 9 also includes a contaminated water holding tank 272, which can feed contaminated water to a MNBA 230 that introduces micro-nano-bubbles of a reactant gas from a reactant gas source 220. The contaminated water and bubbles then flows through the SVR to the holding tank for treated water. This holding tank also includes a gas outlet 274 equipped with a carbon filter, and a treated water outlet 276.

If dictated by material compatibility ($O_3$ and PFAS release/adsorption), the construction of the SVR can be replaced with stainless-steel (SS 316L) tubing of 0.75"-OD, 0.035"-wall, and 0.68"-ID in a circular coil shape. In this particular example, the tubular reactor becomes the SVR when the tube is compressed to form depression zones at regular intervals, e.g. 3 compressions along the longitudinal length of the coil resulting in 3 venturi segments (throats at the compressed zones) in each round of the coil.

The bubble size and size distribution, density of dispersion, and stability (lifetime) of MNB can be characterized with dynamic light scattering (DLS) technique and zeta potential measurements. These bubble properties can be influenced by water and gas flow velocities. Despite their high internal pressure, small bubbles are stabilized in the water phase mainly due to the charged surface (dominated by $OH^-$ ions), which causes significant increase in surface tension that helps balance the increased internal pressure. The negatively charged surface, commonly characterized as negative zeta potential (— 30 mV for air bubbles of a few hundreds of nm size), helps stabilize the bubbles dispersion (against coalescence) in water via electrostatic repulsion. In general, the zeta potential around the bubble increases as its size decreases. Nanobubbles can maintain a stable dispersion in water for several months or longer without coalescing. The bubble size, size distribution, and dispersion density can be characterized by DLS technique. The stability (lifetime) of bubble dispersion (defined as the time needed for a 30% change in zeta potential) can be determined by measuring the zeta potential of bubbles dispersed in water using a DLS instrument (Zetasizer Nano ZS), capable of measuring sizes from 0.3 nm to 10 mm and zeta potential. The size and zeta potential of MNB dispersed in water samples can be measured at a scattering angle of 173° under ambient condition.

pH can also influence the treatment process. The pH of the water can influence the size and zeta potential of MNB with $OH^-$ ions, the charge state of PFAS compounds being treated via proton dissociation as determined by their pK's (e.g. pKa of −3.3 and 3.8 for PFOS and PFOA, respectively), and formation kinetics of active redox species. In some examples, groundwater to be treated can have a pH from 6 to 9. At pH 6 to 9, both PFOS and PFOA (pKa of −3.3 and 3.8, respectively) are fully deprotonated, adsorption and concentration of PFOS and PFOA at the bubble interface are most likely due to the hydrophobic association of the perfluoro-alkane chains with the gas phase that is much more hydrophobic compared to the water phase.

Two reactive radicals, the $O_2\cdot^-$ and $OH\cdot$ radicals, can be responsible for much of the contaminant degradation in the present technology. In balance with $OH\cdot$ formation (by OH-ion losing one electron), $O_2\cdot^-$ can be formed around MNB (by $O_2$ accepting one electron). When $O_3$ is added, $O_2\cdot^-$ can result from $O_3$ hydrolysis (i.e. reaction of $O_3$ with $OH^-$). Therefore, the formation of $O_2\cdot^-$ can be monitored around the MNB. $O_2\cdot^-$ can be measured with a colorimetric method using nitroblue tetrazolium (NBT) as an indicator. Upon reaction with $O_2\cdot^-$, NBT changes its structure to formazan with characteristic absorption around 560 nm. By measuring the absorbance increase at this wavelength, the concentration of $O_2\cdot^-$ around NB can be determined.

The hydroxyl radical $OH\cdot^-$ can be verified and quantitatively measured with a fluorescence turn-on spectrometry using terephthalic acid (TA) as a fluorophore probe. TA is non-fluorescent in its pristine state, but upon reaction with $OH\cdot$ (via hydroxylation at the phenyl ring) turns fluorescent with maximum emission at 426 nm. By monitoring the increasing emission intensity at this wavelength, the OH· concentration can be measured with an appropriate calibration curve.

FIG. 4 summarizes the complex network of formation and depletion reactions of ROS with established rate constants and equilibrium constants in the presence of $O_3$. The rapid free-radical reactions as shown result in low steady-state concentrations of ROS (i.e. $HO_2\cdot/O_2\cdot^-$, $HO_3\cdot/O_3\cdot^-$, $OH/O\cdot^-$, $H_2O_2/HO_2^-$), which are determined by the species' relative kinetic rates of formation and depletion.

The rate expressions for individual ROS are:

$$\frac{d[OH\cdot]_T}{dt} = k_3[HO_3^\cdot]_T - k_4[OH\cdot]_T[O_3] - k_5[OH\cdot]_T[H_2O_2]_T - k_A[OH\cdot]_T[A] - k_s[OH\cdot]_T[S] \quad \text{(Eq 1)}$$

$$\frac{d[HO_3^\cdot]_T}{dt} = k_2[O_3][HO_2^\cdot]_T\alpha_1^{HO_2^\cdot} + k_6[O_3][H_2O_2]_T\alpha_1^{H_2O_2} - k_3[HO_3^\cdot]_T - k_t[HO_3^\cdot]_T[HO_2^\cdot]_T \quad \text{(Eq 2)}$$

$$\frac{d[HO_2^\cdot]_T}{dt} = k_6[O_3][H_2O_2]_T\alpha_1^{H_2O_2} + 2k_1[O_3][OH^-] + k_4[O_3][OH\cdot]_T + k_5[OH\cdot]_T[H_2O_2]_T - k_2[O_3][HO_2^\cdot]_T\alpha_1^{HO_2^\cdot} - k_t[HO_2^\cdot]_T[HO_3^\cdot]_T - k_{O_2^\cdot}^-[HO_2^\cdot]_T\alpha_1^{HO_2^\cdot}[A] \quad \text{(Eq 3)}$$

Among the ROS, $H_2O_2$ is formed even when it is not initially dosed:

$$\frac{d[H_2O_2]_T}{dt} = k_7[O_3][OH^-] - k_6[O_3][H_2O_2]_T\alpha_1^{H_2O_2} - k_5[H_2O_2]_T[OH\cdot]_T, \quad \text{(Eq 4)}$$

where $$[\cdot OH]_T = [\cdot OH] + [O\cdot^-]$$

$$[HO_3\cdot]_T = [HO_3\cdot] + [O_3^-\cdot];\ \alpha_1^{HO_3^\cdot} = \frac{K^{HO_3^\cdot}}{[H^+] + K^{HO_3^\cdot}}$$

$$[HO_2\cdot]_T = [HO_2\cdot] + [O_2^-\cdot];\ \alpha_1^{HO_2^\cdot} = \frac{K^{HO_2^\cdot}}{[H^+] + K^{HO_2^\cdot}}$$

$\alpha_1$, $\alpha_2$=1st, 2nd ionization fraction; $K_1$, $K_2$=first, second acidity constants, respectively, $$\alpha_1^{H_2O_2} = \left(\frac{[H^+]}{K_1} + 1 + \frac{K_2}{[H^+]}\right)^{-1} \approx K_1/[H^+] \text{ for pH} < 10 (pK_1 = 11.6 \text{ for } H_2O_2).$$

The steady-state ROS concentrations can be calculated for two separate cases: 1) hydrogen peroxide has not been added but formed and depleted as a reaction intermediate from $O_3$ hydrolysis, and 2) hydrogen peroxide has been added as a reagent to enhance the formation of ROS. When $H_2O_2$ is not added but formed as a reactive intermediate, the concentration over time profiles and/or steady-state values of individual $HO_2\cdot/O_2\cdot^-$, $HO_3\cdot/O_3\cdot^-$, $OH/O\cdot^-$, and $H_2O_2/HO_2^-$ can be computed by solving Eqs 1 to 4 simultaneously for different pH values. When $H_2O_2$ is added as a reagent to accelerate reductive-oxidative destruction of PFAS, steady-state concentrations of $O_2\cdot^-$ and OH· can be determined by solving Eqs 1 to 3 simultaneously, resulting in Eq 5 and 6 (after neglecting terms of lower magnitude and approximating ionization coefficient $\alpha_1^{HO2}$~1 for pH>6 (pK=4.8 for $HO\cdot_2$):

$$[HO_2^\cdot]_{T,ss} = \frac{k_6[O_3][H_2O_2]_T K_1[H^+]^{-1}}{k_2[O_3]\alpha_1^{HO_2^\cdot} - k_t[HO_3^\cdot] + k_{O_2^\cdot}^-[A]} \approx \frac{k_6[O_3][H_2O_2]_T K_1[H^+]^{-1}}{k_2[O_3] + k_{O_2^\cdot}^-[A]} \quad \text{(Eq 5)}$$

$$[OH\cdot]_{T,ss} = \frac{2k_6[O_3][H_2O_2]_T K_1^{H_2O_2}[H^+]^{-1}}{k_4[O_3] + k_5[H_2O_2]_T + k_A[A] + K_S[S]} \quad \text{(Eq 6)}$$

These expressions will estimate active $O_2\cdot^-$ and OH· concentrations based on pH, $O_3$, $H_2O_2$, S (e.g. $HCO_3^-$ and natural anions), and A (contaminant concentrations such as PFAS). Equations 5 and 6 are useful in optimizing $O_2\cdot^-$ and OH· concentrations for degradation of PFAS.

Regarding the action of free radicals at the interface zone of the micro/nanobubbles, $O_2\cdot^-$ and OH· are created in the SVR by reactions of $O_3$ with OH· (hydrolysis) and with $H_2O_2$ (peroxone) at the air-water interface where PFAS surfactants concentrate, resulting in heightened degradation. To achieve this, ozone gas is introduced by the MNBA into the flow reactor in the form of micro/nanobubbles and are directed to oscillate in size following the SVR flow path. The oscillation (repeated bubble expansion and contraction) provides heightened contact of $O_3$ with interfacial $H_2O$ (and with abundant $H_2O_2$ when dosed) that creates a suite of ROS (i.e. $H_2O_2$, $O_2\cdot^-$, $O_3\cdot^-$, and OH·; predominant forms of conjugate acid/base at neutral pH), capable of both reductive and oxidative reactions as above. While OH· radical is among the most potent oxidants known, $O_2\cdot^-$ and $O_3\cdot^-$ are effective reductants, thus enabling the complementary redox reaction capable of working concertedly for PFAS degradation.

When both $O_2\cdot^-$ and OH· are present abundantly, the degradation of PFOS is possible via concerted, alternate reductive and oxidative attacks by $O_2\cdot^-$ and OH· at the micro/nanobubble interface. The reactions of $O_2\cdot^-$ and OH· with PFOS and PFOA mirror those of hydrated electron $e^-_{aq}$ and OH· in plasma-based degradation mechanisms. Reductive defluorination of PFAS by $e^-_{aq}$ followed by H/F exchanges on the α-position and C—F bond cleavage as well as pathway involving decarboxylation, hydroxylation, elimination, and hydrolysis can be used for PFAS degradation. Hydroxyl radical alone is not effective for PFAS degradation, whereas a mixture of reactive oxygen species such as OH·, O, H·, $HO_2\cdot$, $O_2\cdot$—, $H_2$, $O_2$, and $H_2O_2$ in plasma can be highly effective. The reactive environment can include both $O_2\cdot^-$ and OH· for PFOS and PFOA degradation. The process can involve $O_3$ at high pH, i.e., enhanced formation of both $O_2\cdot^-$ and OH radicals via high $[OH^-]$; or in the case of $O_3/H_2O_2$, it also creates $O_2\cdot^-$ and OH· (via faster $k_6$). The $O_3$-created free radicals can degrade PFOS/PFOA, and complete PFAS elimination can be achieved over a sufficient time period, such as about 4 hours, depending on conditions. In the technology described herein, $O_2\cdot^-$ and OH· can be produced and used efficiently because of their creation at the oscillating bubble interface in close proximity to where surfactant PFAS compounds aggregate and the process can be continually carried out in a closed-loop, recirculating system.

In an example of the present technology, PFAS-spiked water and PFAS-spiked groundwater can be treated by the concerted reductive-oxidative $O_2\cdot^-$/OH· treatment scheme. Initially, about 2 L of PFAS-spiked water (2 L) is treated in the recirculating SVR to examine degradation (note that volume can be readily scaled up by increasing tubing length and/or diameter). Various amounts and concentration ratios of $O_3$ and $H_2O_2$ can be used to promote reactive free radicals as predicted by Eqs 5 and 6 for reactive species for PFAS elimination. Removal efficiency can be determined at incremental volumes to 10 and 50 L by connecting additional SVR modules. Parameters that can be adjusted include: PFAS concentration (e.g. 5 mg/L-50 ppb or lower) in the spike water, PFAS-contaminated groundwaters (conc. per HAFB samples), $O_3$ stream concentration (0%-5%), $H_2O_2$ dose and frequency (0-100 mg/L), ozone addition time/frequency, water and gas flowrates and ratios (L/min and mL/min, to be determined by the MNBA, pump, and venturi capacities), inlet gas pressure (atm, to be determined depending on operation conditions), SVR reactor length (30' to 150') with associated number of venturis (i.e. number of oscillations), bed volumes of recirculation (1 to 100), and treatment recirculation time (30 min to 5 h). Removal vs. treatment parameters can be established experimentally. Viable and efficient operation conditions to achieve treatment targets can thus be identified.

Degradation of PFAS using the MNBA-SVR system can be evaluated during recirculation of water between the holding tank and the SVR directly until the water is PFAS-free. Degradation of PFAS and formation of intermediates and products can be monitored throughout. Samples can be collected from the holding tank periodically and analyzed by LCMSMS to determine residual organic chemical kinds and concentrations, as well as residual ozone following treatment (recirculation) time under various parameters identified above. Concentration vs. time profiles under various conditions can be used for kinetic rates and reaction orders analyses. The primary target of success for PFAS removal can be ≤70 ppt, the health advisory level for PFOA and PFOS in safe drinking water. Additionally, the water can be treated to the target of 13 ppt, a stricter groundwater standard promulgated by several states, including California and New Jersey.

While ozone is expected to be completely expended after cycling through the long SVR reactor path, samples can be collected and analyzed at the holding tank, as well as measuring residual concentrations in the lines to and from the holding tank. The residual concentration provides a check on the adequacy of the overall reactor length with the number of venturis deployed, whether additional reactor length is desirable, and whether reduced or increased $O_3$ and $H_2O_2$ doses relative to PFAS concentrations and observed degradation kinetics are warranted. Mathematical models can also be prepared for the stages of cleanup and recirculation to enable predictive system performance and guide future treatments. The holding tank can be sealed with a vent exit equipped with an activated carbon filter to trap residual $O_3$ (if any) and allow gas to leave the system safely.

Generally, remediation efforts are hampered by the hydrophobic nature of the contaminants that limits their availability as well as by the sediment matrix that limits their exposure to treatment agents. Ozonation via rapid, successive cycles of pressurization and depressurization can enable more effective treatment than conventional ozonation would. The heightened treatment can be explained by soil aggregate being fractured by pressure cycles that exposes the contaminants and by confluence of hydrophobic contaminants and $O_3$ at the gas-liquid interface in the presence of microbubbles. In the reactors and systems described herein, ozone can be completely used as the long-living nanobubbles travel and recirculate through the long tubular reactor with multiple venturis, with the interface alternately expanding and contracting to promote $O_2{\cdot}^{-}$/OH· production for contaminant degradation. Specifically targeting PFAS, these reactors and systems can also be used for other contaminants.

The MNBA-SVR system can be used to treat soil slurry in a manner identical to that for water, albeit sufficient flow rates can be employed to avoid settling and openings at the venturi throats can be sufficient for solids passage. Excavated soil can be introduced by a triplex slurry pump into the MBNA-SVR system in slurry form and be recirculated in the system for various time durations to define the removal rates. Soil can be analyzed before and after treatment for residual PFAS and intermediates per ASTM Method ASTM D7968-17 for soil. Parameters that can be adjusted can include: soil concentration (5-35%) and flow rate, gaseous ozone concentration (0.1 to 5%) and flow rate, water flow rate, flow ratio of gas to water, reactor length (i.e. volume and number of pressure cycles in one pass), residence time (contact time; 1 to 5 h), and concentration of PFAS (5 mg/L or other sample levels). Degradation rates for various PFAS compounds can be defined according to these parameters.

In some examples, the entire system can be mounted on a mobile platform. This can allow the system to be taken to any location for soil remediation, water decontamination, rinsing of water tanks in firefighting vehicles, etc.

Degradation of PFAS in the SVR can be monitored by instrumental chemical analysis during recirculation of water between the holding tank and SVR until all the PFAS compounds are removed in the closed-loop system. Depending on the reaction conditions (e.g., size and density of MNB, pH, and addition of $O_3$ and/or $H_2O_2$), the degradation pathways mediated by $O_2{\cdot}^{-}$/OH· radicals and related ROS can be different, which can in turn lead to formation of a broad range of intermediates, including shorter-chain PFAS, small organic acids (e.g., trifluoroacetic acid, acetic acid, and formic acid), as well as F. Reactions R1 through R12 of FIG. 7 show in detail possible pathways in the degradation of PFOS, which is illustrated here as a representative of PFAS. Due to $O_3$ hydrolysis and release of fluoride from PFAS, changes in pH can be monitored and its effect on speciation and degradation kinetics can be accounted for and adjusted. While the degradation of PFAS can follow pseudo-first order kinetics in most radical-mediated AOP systems (e.g. ozone, persulfate, and plasma or UV-initiated electrons), the intermediates being formed during degradation may exhibit complex kinetic behaviors, such as increasing concentrations initially followed by decreasing concentrations as degradation progresses as influenced by reaction conditions. Characterization of various shorter-chain PFAS being formed can confirm the occurrence of a stepwise chain-shortening of the parent PFAS as illustrated in R1-R12.

Samples collected at various time intervals during treatment can be analyzed by liquid chromatography coupled with tandem mass spectrometry (LC/MS/MS), EPA Method 537 and ASTM D7968-17 for water and slurry sample, respectively, for identifying the molecular structure and determining the concentration of related reaction intermediates. In these methods, LC/MS/MS has been extensively used in analysis of PFAS species in many different water systems, particularly in monitoring and evaluation of AOP treatment of PFAS pollutants. The LC/MS/MS can be an ultra-performance liquid chromatography (UPLC) coupled with high resolution tandem mass spectrometry (Waters Xevo G2S Q-ToF w/Acquity I Class UPLC). UPLC operates at higher pressures (~15,000 psi) in comparison to normal HPLC (<6000 psi), and allows for smaller particle sizes in columns for larger surface area; this results in dramatic increase in resolution, speed, and sensitivity of liquid chromatography. This can be useful for separation and identification of reaction intermediates that are analogous in size, structure, and chemical property (e.g., shorter-chain intermediates from PFAS may differ by only one carbon).

As a surfactant, PFAS strongly interfere with LC columns through the adsorption and desorption process, and these interactions are sensitive to a change in pH and presence of other ions in the solution, which in turn affect the chemical state of the sulfonate group of PFAS. To make consistent and reliable LC measurements, all samples for LC analysis can be controlled precisely in pH by buffer agents including ammonium hydroxide and ammonium acetate as well as selection of appropriate solvents (pure DI water or the mixture with acetonitrile or methanol at varying volume ratio depending on the LC column used and operation conditions). Quantitative concentration measurements can be performed following standard calibrations with a series of concentrations of PFAS (and the degradation products), e.g. 0.0, 0.05, 0.1, 0.5, 1.0, 2.0, 5.0 μg/L (0-5 ppb), which will generate a linear dynamic range, allowing for determining the limit of detection based on three times the standard deviation of measurement.

Along with LCMSMS analysis of PFAS degradation products, released during degradation can be determined by an ion selective electrode (ISE). The accuracy of ISE measurement can be validated by standard calibration and ion chromatography. The time-course measurement of $F^-$ concentration can be used to determine mass balance for F" release and PFAS degradation, thus further verifying the reaction pathways as depicted in R1-R12. Kinetic results obtained from the formation of $F^-$ ions can also provide a deeper insight into the reaction mechanism involving radicals and dependence on the treatment conditions.

Figure 10:
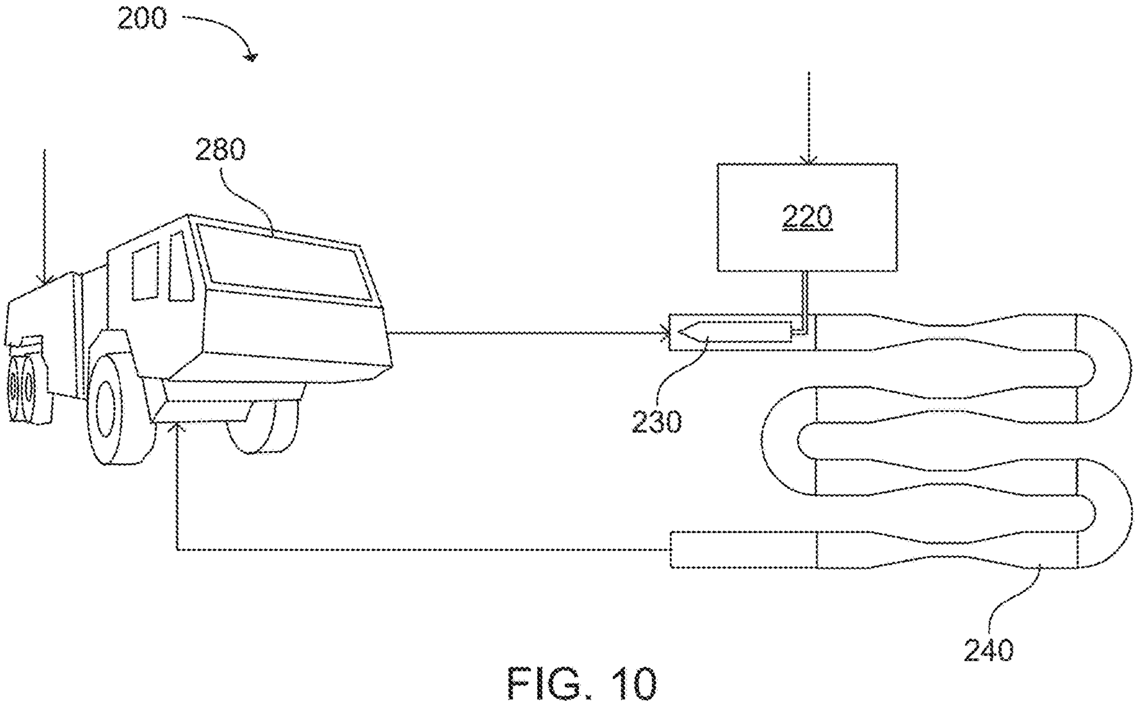
FIG. 10 is a schematic view of another example decontamination system in accordance with the present disclosure.

FIG. 10 shows another example of a decontamination system 200. In this example, the contaminated liquid source is a water tank of an aircraft rescue and firefighting vehicle 280 (ARFFV). The tank can be contaminated with PFAS that have previously been included as an ingredient in firefighting foam. Therefore, the present systems can be useful for removing PFAS from the tank. To initiate cleaning, a mobile platform carrying the SVR 240 and MBNA 230 can be parked alongside and the ARFFV's delivery nozzle can be connected to the SVR's inlet. An exact fire-fighting operation is performed in which clean water (and in some cases only clean water) is used in the vehicle's water tank and foam tank and water is directed through the entire delivery mechanism of the ARFFV including the foam making branch pipe (FMBP), valves, foam proportion valve, pipeline, delivery hose, delivery outlet valves, etc. before it reaches the inlet of the SVR, carrying the PFAS to be removed. The MNBA can deliver bubbles of a reactant gas from a reactant gas source 220. In this example, the reactant gas source can be ozone generator.

The SVR can be a long tubular flow reactor comprised of a long, winding pipe with repeating venturi sections along its path. At the first venturi near the inlet, an ozone gas stream is introduced into the flowing water in the form of microbubbles by means of a MNBA, which includes porous ceramic nozzle pointing toward the coming flow. The MNBA is connected to a reactant gas source, which in this example is an ozone gas generator. The microbubbles are carried by the flowing water and they oscillate in size when they pass through repeating venturis along the reactor path, i.e. interfacial area of the bubbles expands when passing through the throat sections and interfacial area contracts when passing through the diffuser zones. The oscillation of a large number of small bubbles with very large interfacial area heightens contact between gaseous ozone molecules with water molecules at the interface, which creates hydroxyl radicals at the interface in close proximity to where the surfactant molecules PFAS are aggregating, leading to effective destruction of PFAS by OH radicals.

Figure 11:
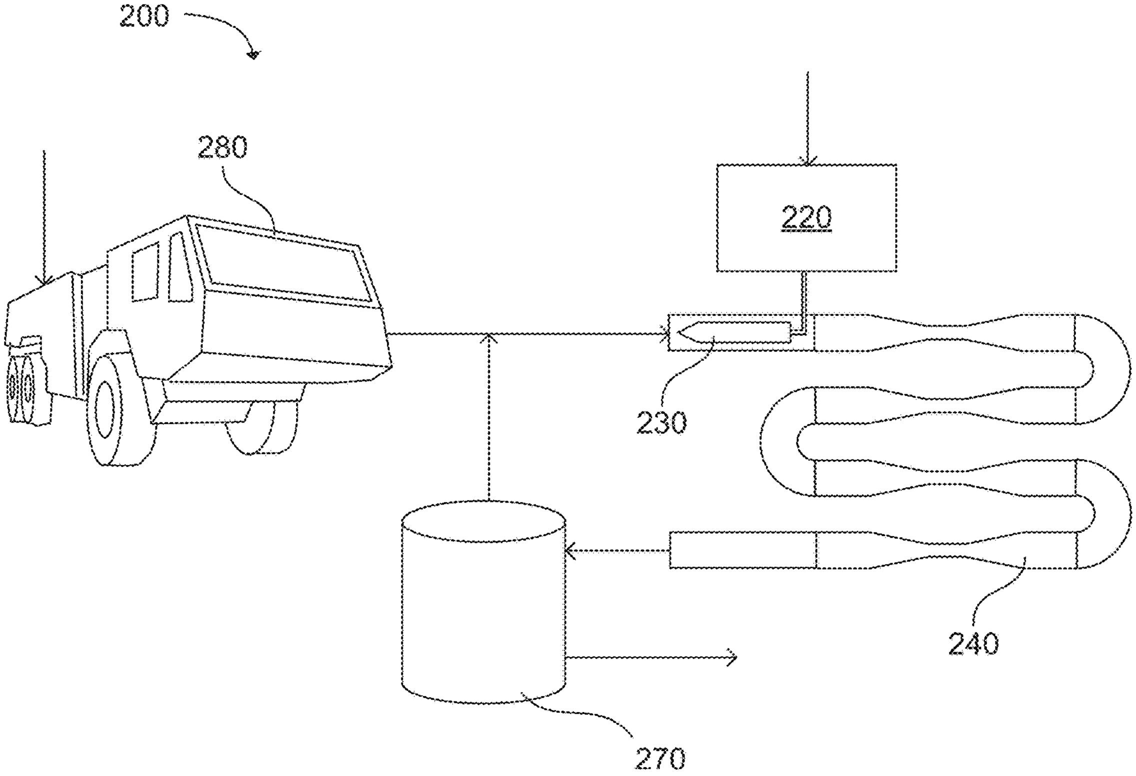
FIG. 11 is a schematic view of another example decontamination system in accordance with the present disclosure.

The SVR can be operated primarily in the laminar flow regime, and the flow through the entire system (i.e. the ARFFV and SVR) can be powered entirely by the ARFFV's water pump by intake from the clean water tank and recirculation until the water is clean. An alternative example decontamination system 200 is shown in FIG. 11. This example includes a discharge holding tank 270. Water that has passed through the SVR can be directed to the holding tank and then recirculated between the SVR and the holding tank by an additional pump forming a closed loop until the water is clean. In some cases, the example of FIG. 10 can be more efficient because it uses the ARFFV's pump to power water through the system and treat a minimum of water in a closed loop, whereas the example of FIG. 11 allows no direct contact of the oxidant and any byproducts with the delivery mechanism of the ARFFV, treating only the rinsesate albeit at a larger volume, when contact is undesirable such as when the oxidant would damage ARFFV equipment.

The system can efficiently create and use ozone. The ozone gas stream can be drawn into the reactor through a venturi and a porous nozzle of the MNBA facing the oncoming water jet, creating micron-size ozone bubbles. The small diameter of bubbles results in high internal pressure, i.e. Laplace pressure (4× the atmosphere at 1 μm) plus hydrostatic pressure, which accelerates mass transfer (per Henry's law) into the liquid phase. For reason of reduced buoyancy and increased mass transfer of small bubbles, they can shrink rapidly into nano-sizes that can remain in water indefinitely, ultimately enabling the complete use of the ozone dose.

The system can also efficiently create and use OH· radicals. The OH· can be created by radical by reactions of $O_3$ with water ($OH^-$) into superoxide $O2^{\cdot -}$ then into ozonide ($O_3^{\cdot -}$) and then OH·. This is more energy-efficient than operating a venturi at cavitation condition to create OH·. Alternatively, hydrogen peroxide ($H_2O_2$) can be dosed into water to react with $O_3$ to rapidly create OH· (faster k6 step than k1 step in FIG. 4).

The system can also provide abundant interface for aggregation of surfactant contaminants and immediate exposure to OH radical created at close proximity. The micro/nanobubbles create abundant interface to attract the surfactant PFAS to be in close proximity with $O_3$ in the gas phase. $O_3$ reacts with water at the interface to create reactive OH· radical immediately available for degradation of PFAS. The repeating venturi constrictions along the reactor path create pressure oscillations that creates oscillations of the interface for increased exposure of $O_3$ at the interface and ozone-generated OH· radical reaction with PFAS there. Further, the oscillation of the interface can lead to OH· creation and reaction with PFAS in the gas phase, the interface, and at shallow liquid phase.

Water can be continually recirculated during treatment until it is clean. The flow can be powered by the ARFF vehicle's pump or by an additional pump, providing flushing of all water delivery mechanisms of the vehicle. The SVR can be integrated with the vehicle in closed-loop treatment until the system is free of PFAS, minimizing environmental exposure to the contaminants.

Figure 12:
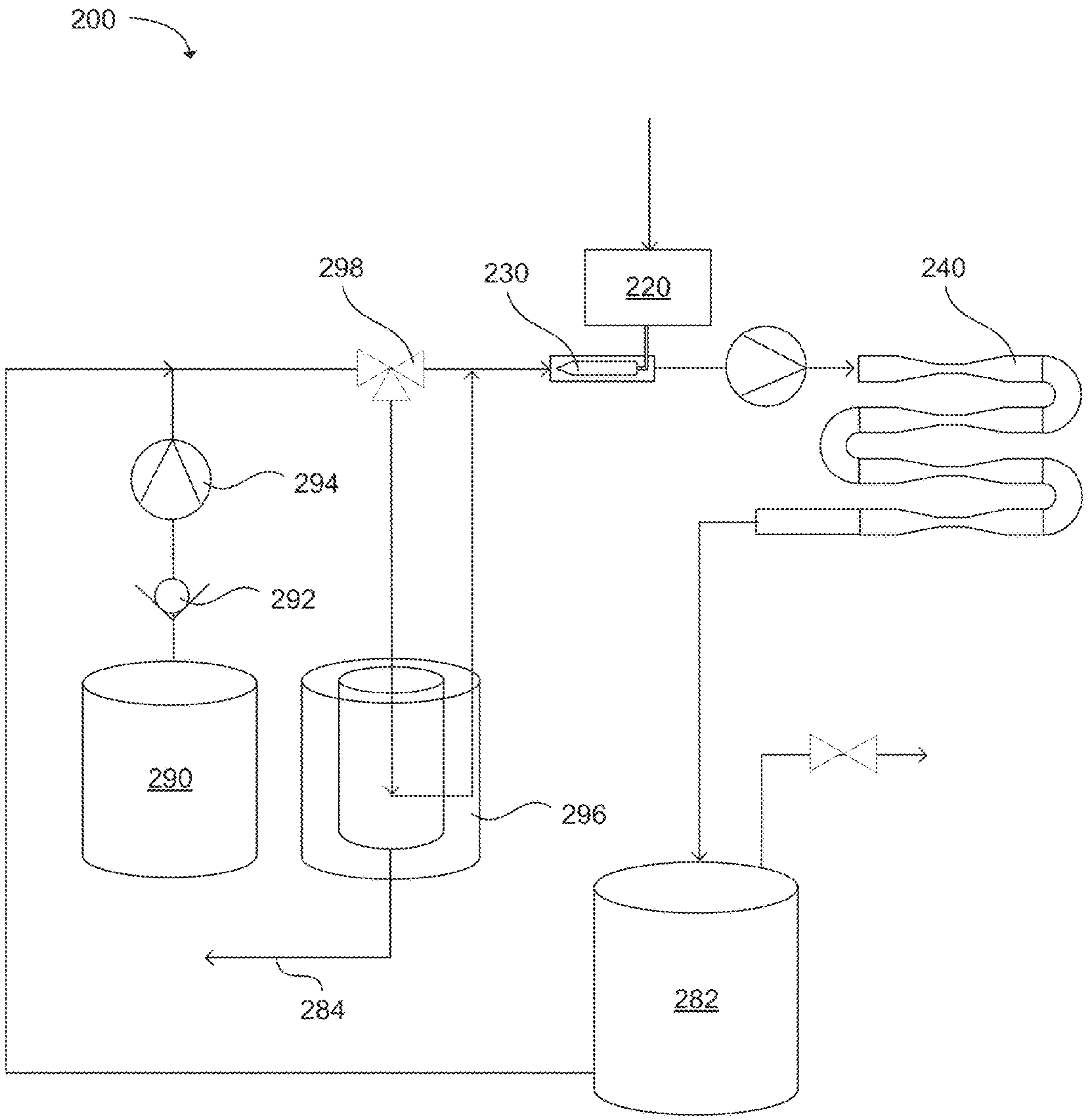
FIG. 12 is a schematic view of another example decontamination system in accordance with the present disclosure.

Referring to FIG. 12, another example decontamination system 200 can include a contaminated water or soil slurry tank 290 which has an outlet including a check valve 292 and includes a feed pump 294 to draw slurry from the contaminated liquid tank. A soil-water separator 296 can be fluidly connected to the contaminated liquid tank via a valve 298 which allows optional direction of a slurry through the separator to facilitate separation of separable solids prior to treatment via the MBNA 230 and SVR 240. Contaminated liquids can also bypass the soil-water separator depending on composition. Liquid having reduced or eliminated solids can then be directed to the MBNA which includes a reactant gas source fluidly coupled to the MBNA. The fluid can then be sent through the SVR consistent with the conditions described herein. As gas is continually supplied to the treatment system from a reactant gas source 220, and a gas-water separator 282 is equipped to allow continual discharge of excess gas, while the water can be recirculated in the system or be sent to a treated water holding tank. Clean soil can be removed from the soil-water separator via a clean soil stream 284.

Figure 13:
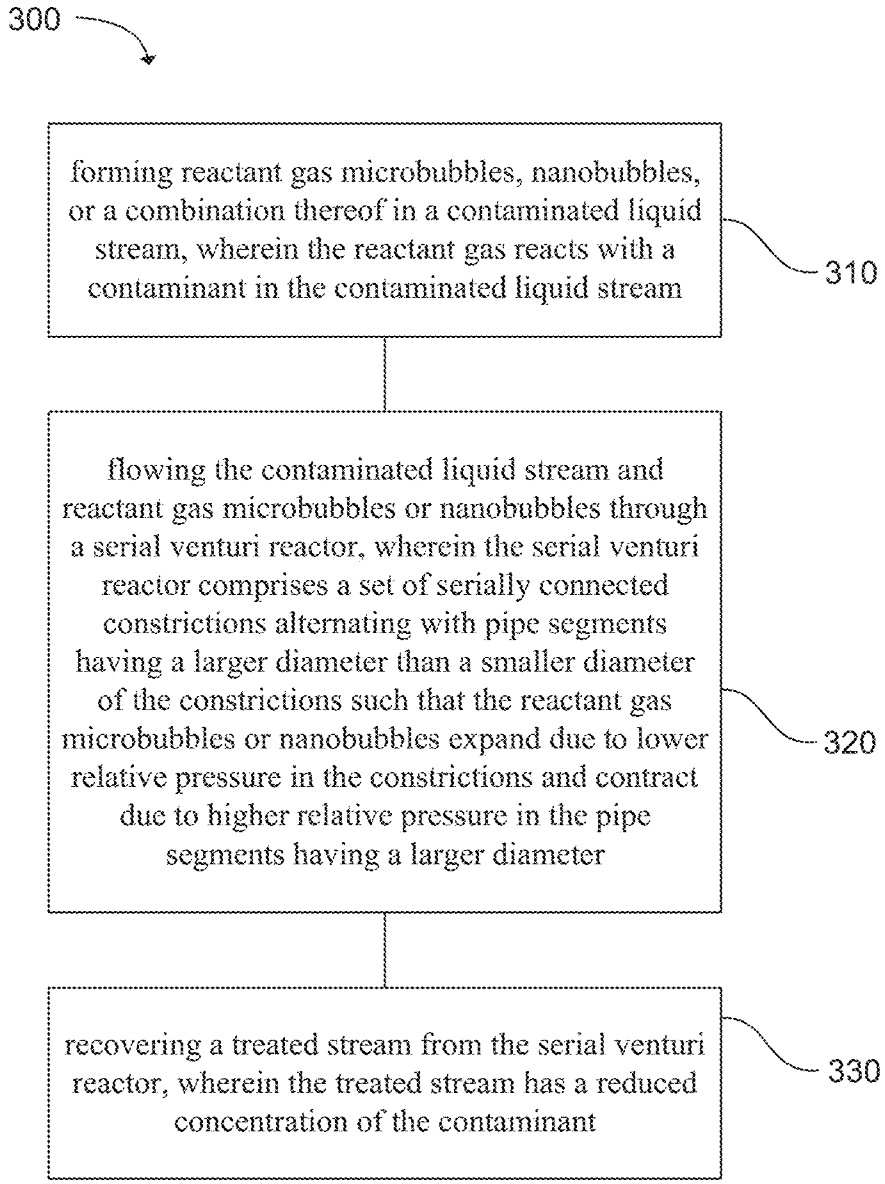
FIG. 13 is a flowchart illustrating an example method of decontaminating a contaminated liquid stream in accordance with the present disclosure.

The present disclosure also describes methods of decontaminating contaminated liquid streams. FIG. 13 is a flowchart illustrating one example method 300 of decontaminating a contaminated liquid stream. This method includes: forming reactant gas microbubbles, nanobubbles, or a combination thereof in a contaminated liquid stream, wherein the reactant gas reacts with a contaminant in the contaminated liquid stream 310; flowing the contaminated liquid stream and reactant gas microbubbles or nanobubbles through a serial venturi reactor, wherein the serial venturi reactor comprises a set of serially connected constrictions alternating with pipe segments having a larger diameter than a smaller diameter of the constrictions such that the reactant gas microbubbles or nanobubbles expand due to lower relative pressure in the constrictions and contract due to higher relative pressure in the pipe segments having a larger diameter 320; and recovering a treated stream from the serial venturi reactor, wherein the treated stream has a reduced concentration of the contaminant 330.

The method of decontaminating contaminated liquid streams can be performed using any of the oscillating bubble reactors and decontamination systems described above. In some examples, the reactant gas can be ozone, air, oxygen, carbon dioxide, hydrogen, methane, or a combination thereof. The reactant gas microbubbles or nanobubbles can have an average bubble diameter from about 10 nm to about 10 μm, and in some cases to about 1 μm. The reactant gas can be added to the contaminated liquid stream at a concentration from about 0.1 vol % to about 20 vol %, and in some cases up to 100 vol % in the gas stream. In some examples, the contaminated liquid stream can be a wastewater stream, a groundwater stream, water mixed with contaminated soil, or water from a water tank of a firefighting vehicle. The water mixed with contaminated soil can have a soil concentration from 5 wt % to 35 wt %. In some examples, the contaminant can be a polyfluoroalkyl substance. The polyfluoroalkyl substance is present in the contaminated liquid stream at an initial concentration from about 5 mg/L to about 5 ppt. In some examples, the reduced concentration of the contaminant can be less than 70 ppt. In further examples, the reduced concentration of the contaminant can be less than 13 ppt. The contaminated liquid stream can flow through the serial venturi reactor at a flow rate that provides a laminar flow regime. The flow rate can be from laminar flow (Reynold number, Re, <2000) to turbulent flow (Re>2000), depending on pipe size and pump capacity. In further examples, the reactant gas can be added to the contaminated liquid stream at a flow rate from about 10 mL/min to about 5000 mL/min to create bubbles of designated sizes between 10 nm-10 μm. The pressure differential that the bubbles experience is what causes the bubbles to oscillate as they travel through the alternate low pressure (constricted) zone and high pressure (larger-diameter) zone, which is determined by the flow velocities through the two zones as determined by the Bernoulli equation. In various examples, the number of constrictions in the serial venturi reactor can be from 5 to 100, and in some cases 5 to 50. A ratio of the larger diameter to the smaller diameter can be from about 1.3 to about 8, and in some cases up to about 3. The serial venturi reactor can have a reactor length along a flow pathway from a first constriction to a last constriction, where the reactor length is from about 10 feet to about 150 feet. In some examples, the serial venturi reactor can include elbows between the constrictions and the serial venturi reactor can have the form of stacked quadrilateral loops. The method can also include adding an additional reactant to the contaminated liquid stream. The additional reactant is hydrogen peroxide in some examples. The hydrogen peroxide can be added to the contaminated liquid stream at a concentration from about 0.1 mg/L to about 100 mg/L, or at a weight ratio of 0 to 100 in hydrogen peroxide to ozone. In further examples, the reactant gas microbubbles or nanobubbles can be formed by a micro-nano-bubble aerator (MNBA) positioned upstream of the serial venturi reactor or in the serial venturi reactor. In some examples, the MNBA can be positioned in a venturi constriction of the serial venturi reactor. In other examples, the MNBA can be positioned upstream of a venturi constriction of the serial venturi reactor. The MNBA can include an aerator body having a conical upstream end and a plurality of perforations, where the reactant gas is injected through the perforations. The aerator body can be made of stainless steel, ceramic, inert plastics such as PTFE, PEEK, HDPE, or polycarbonate, or combinations thereof. The MNBA can also include a hydrophobic membrane sleeve around the aerator body. The hydrophobic membrane sleeve can be made of polytetrafluoroethylene, polypropylene, PEEK, HDPE, polycarbonate, or combinations thereof. In some examples, the hydrophobic membrane can have pores with an average pore size from 5 to 30 μm.

The method can also include holding treated liquid in a treated liquid holding tank connected downstream to the serial venturi reactor. The treated liquid holding tank can include a vent with a carbon filter to filter vented gas. The method can also include recycling the treated liquid from the treated liquid holding tank to the serial venturi reactor. The treated liquid can be recycled from the treated liquid holding tank to a contaminated liquid source and the contaminated liquid stream can flow from the contaminated liquid source to the serial venturi reactor. In some examples, the contaminated liquid stream can be a finite volume of liquid, and the method can include recycling the finite volume of liquid through the serial venturi reactor multiple times. In some examples, the finite volume of liquid can be recycled from 2 times to 100 times and then the liquid can be recovered as the treated stream. In further examples, the finite volume of liquid can be recycled until the concentration of the contaminant is reduced to a target concentration and then the liquid can be recovered as the treated stream. The target concentration can be less than 70 ppt. The finite volume of liquid can be recycled for a period of time from about 30 minutes to about 5 hours.

EXAMPLES

A prototype MNBA was constructed for evaluation. Large air bubbles emerged from the PTFE membrane-cladded diffuser in a quiescent water, and the emerging bubble size was significantly reduced when water to flowed faster driven by a water pump. At a steady state water velocity, air bubbles continually emerged as small, hardly discernible bubbles at a steady state. In one example, the material for the diffuser can be stainless steel 316 (resistant to $O_3$ and suitable for PFAS) cladded in PTFE (inert to $O_3$ but potentially may release PFAS) or polypropylene (contains no PFAS but may slowly deteriorate under prolonged $O_3$ contact).

The prototype MNBA was used to generate nanobubbles in samples of water. A red laser was then used to shine a beam through the water. It was found that light from the red laser was not scattered, or scattered very little, before the nanobubbles were introduced to the water. However, the light from the laser was scattered intensely after the nanobubbles had been introduced to the water. A series of water samples were aerated with nanobubbles for different aeration times. The turbidity of the water was measured, and it was found that the turbidity increased with increasing aeration time. This was repeated with water samples having three different pH levels, and the same pattern was observed. Table 1 shows the pH level, aeration time, and turbidity of the water samples.

TABLE 1

| Sample No. | pH | Aeration Time (min) | Turbidity (NTU) |
|---|---|---|---|
| 1 | 4.01 | 0 | 0.00 |
| 2 | 4.01 | 20 | 0.02 |
| 3 | 4.01 | 30 | 0.08 |
| 4 | 4.01 | 50 | 0.10 |
| 5 | 4.01 | 60 | 0.11 |
| 6 | 7.02 | 0 | 0.00 |
| 7 | 7.02 | 10 | 0.07 |
| 8 | 7.02 | 20 | 0.09 |
| 9 | 7.02 | 30 | 0.12 |
| 10 | 7.02 | 50 | 0.15 |
| 11 | 7.02 | 60 | 0.18 |
| 12 | 10.2 | 0 | 0.00 |
| 13 | 10.2 | 20 | 0.10 |
| 14 | 10.2 | 40 | 0.28 |
| 15 | 10.2 | 60 | 0.38 |

Figure 14:
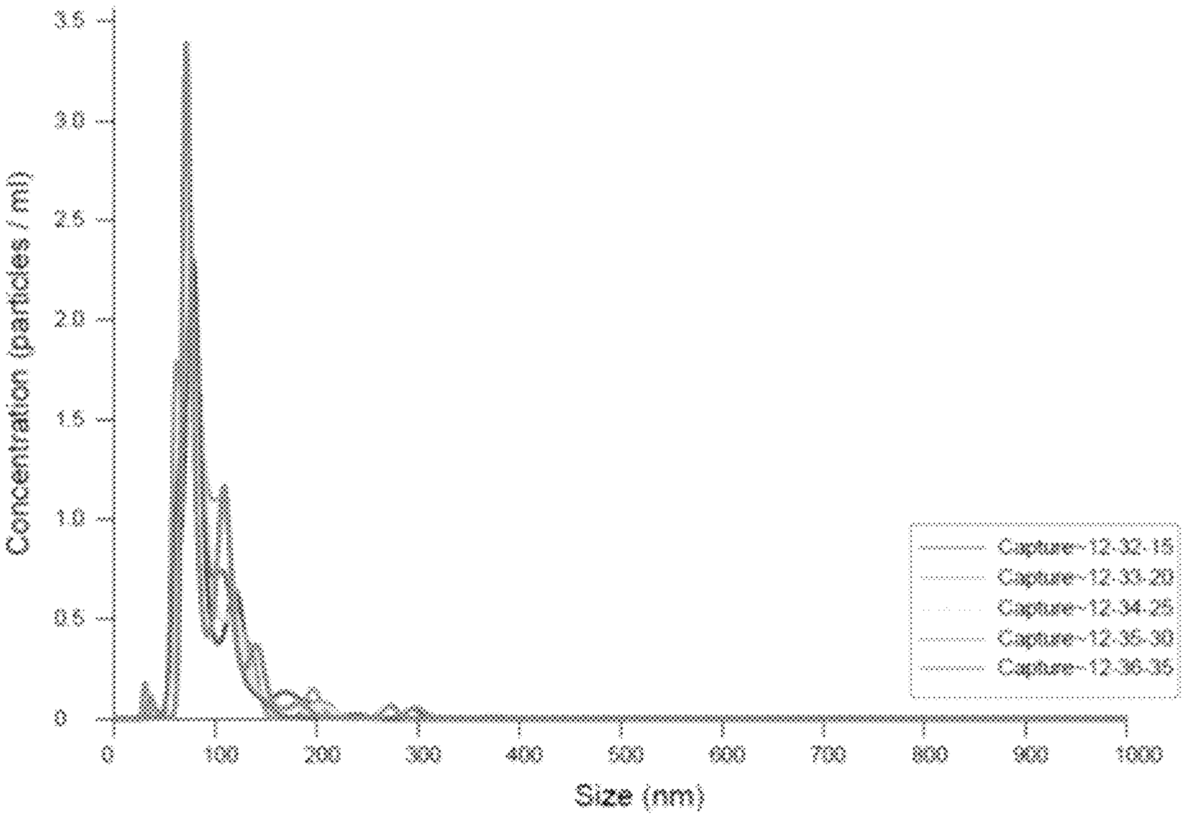
FIG. 14 is a graph of particle size distribution of micro-nano-bubbles produced using an example micro-nano-bubble aerator in accordance with the present disclosure.

The bubbles produced by the prototype MNBA were measured using nanoparticle tracking analysis. The measured bubbles had the following statistics: mean diameter: 94.3 nm; mode diameter: 74.2 nm; standard deviation: 36.3 nm; D10: 65.0 nm; D50: 83.3 nm; D90: 131.1 nm. FIG. 14 shows a graph of several data captures of particle size distribution for the bubbles.

A prototype SVR was constructed with ¾-inch CPVC (or HDPE or polypropylene) (Schedule 40) piping of 1.05" (2.67 cm)-OD, 0.113" (0.287 cm)-wall, and 0.804" (2.04 cm)-ID in a square coil shape. Selected lengths can be used to form reactors of varied volumes (e.g. initially 7.5, 15, and 30 m lengths for approximately 1, 2, 4 L, respectively), which can be readily scaled up by use of larger tubing diameter or serially connected and stacked to form larger (scalable) reactors. In this particular example, the tubular reactor becomes the SVR when the diameter is restricted with pre-manufactured venturi irrigation fittings to form depression zones at regular intervals, e.g. 1 compression along each side length of each coil level, resulting in 4 venturi segments in each round of the coil. As the micro-nano-bubble-laden water flows and recirculates in the SVR, the micro-nano-bubbles oscillate in sizes that increase agitation and contact between the gas and liquid films at the interface, where at the PFOS molecules are concentrated.

The prototype SVR and MNBA were used to remove PFAS from impacted groundwater. Various flow rates of reactant gas (3 vol % ozone in air) were injected through the MNBA into the impacted groundwater stream. Various volumes of groundwater were circulated continuously for various times. The percent of PFAS removed was then measured. The results of these experiments are shown in Table 2:

TABLE 2

| 3% $O_3$ Flow (LPM) | Volume of Water (L) | Time (h) | Removal (%) |
|---|---|---|---|
| 0.8 | 15 | 3 | 33 |
| 0.8 | 15 | 0.5 | 19 |
| 0.3 | 8 | 1 | 41 |
| 0.4 | 15 | 3.5 | 20 |
| 0.25 | 20 | 2.5 | 50 |

The prototype SVR and MNBA were also used to remove nitrotriazolone (NTO) from water spiked with nitrotriazolone. Three runs were performed. Substantially all of the NTO was removed after a sufficient time in each of the runs. The initial concentration of NTO, circulation times, and removal percentages are shown in Table 3:

TABLE 3

| Run | Initial NTO (mg/L) | Time (min) | Removal (%) |
|---|---|---|---|
| 1 | 164 | 0 | 0 |
| 1 | 164 | 65 | 96 |
| 1 | 164 | 120 | 100 |
| 2 | 89 | 0 | 0 |
| 2 | 89 | 15 | 99 |
| 2 | 89 | 30 | 99 |
| 3 | 13 | 0 | 0 |
| 3 | 13 | 15 | 99 |
| 3 | 13 | 30 | 98 |

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

What is claimed is:

1. An oscillating bubble reactor, comprising:
   - a stream inlet configured to receive a contaminated liquid stream;
   - a reactant gas source;
   - a serial venturi reactor connected downstream to the stream inlet and configured to receive the contaminated liquid stream, wherein the serial venturi reactor comprises a set of serially connected constrictions alternating with pipe segments having a larger diameter than a smaller diameter of the constrictions;
   - a micro-nano-bubble aerator (MNBA) in the stream inlet or the serial venturi reactor, the MNBA being connected to the reactant gas source and configured to release reactant gas microbubbles, nanobubbles, or a combination thereof into the contaminated liquid stream from the reactant gas source; and
   - a treated stream outlet connected downstream to the serial venturi reactor, wherein the constrictions and pipe segments are fluidly connected in series with the constrictions between the pipe segments to form a single conduit such that the reactant gas microbubbles, nanobubbles, or combination thereof oscillate in size by repeatedly expanding due to lower relative pressure in the constrictions and contracting due to higher relative pressure in the pipe segments while flowing through the serial venturi reactor.

2. The oscillating bubble reactor of claim 1, wherein the reactant gas source is a source of ozone, air, oxygen, hydrogen, methane, carbon monoxide, carbon dioxide, or a combination thereof.

3. The oscillating bubble reactor of claim 2, wherein the reactant gas source is an ozone generator connected to an air source.

4. The oscillating bubble reactor of claim 1, wherein a number of constrictions in the serial venturi reactor is from 5 to 50.

5. The oscillating bubble reactor of claim 1, wherein the serial venturi reactor has a reactor length along a flow pathway from a first constriction to a last constriction, wherein the reactor length is from about 10 feet to about 150 feet.

6. The oscillating bubble reactor of claim 1, wherein the serial venturi reactor further comprises one or more reactant inlets connected to one or more of the constrictions.

7. The oscillating bubble reactor of claim 1, wherein the MNBA is positioned in a venturi constriction of the serial venturi reactor.

8. The oscillating bubble reactor of claim 1, wherein the MNBA is positioned upstream of a venturi constriction of the serial venturi reactor.

9. The oscillating bubble reactor of claim 1, wherein the MNBA comprises an aerator body having a conical upstream end and a plurality of perforations in fluid communication with the reactant gas source.

10. The oscillating bubble reactor of claim 9, wherein the MNBA further comprises a hydrophobic membrane sleeve around the aerator body.

11. The oscillating bubble reactor of claim 10, wherein the hydrophobic membrane sleeve comprises polytetrafluoroethylene, polypropylene, PEEK, HDPE, polycarbonate, or combinations thereof.

12. The oscillating bubble reactor of claim 10, wherein the hydrophobic membrane sleeve has pores with an average pore size from 5 to 30 μm.

13. A decontamination system, comprising:

a contaminated liquid source; and an oscillating bubble reactor connected to the contaminated liquid source and configured to treat the contaminated liquid, wherein the oscillating bubble reactor comprises:

a stream inlet configured to receive a contaminated liquid stream from the contaminated liquid source, a reactant gas source, a serial venturi reactor connected downstream to the stream inlet and configured to receive the contaminated liquid stream, wherein the serial venturi reactor comprises a set of serially connected constrictions alternating with pipe segments having a larger diameter than a smaller diameter of the constrictions, a micro-nano-bubble aerator (MNBA) in the stream inlet or the serial venturi reactor, the MNBA being connected to the reactant gas source and configured to release reactant gas microbubbles, nanobubbles, or a combination thereof into the contaminated liquid stream from the reactant gas source, and a treated stream outlet connected downstream to the serial venturi reactor, wherein the constrictions and pipe segments are fluidly connected in series with the constrictions between the pipe segments such that the reactant gas microbubbles, nanobubbles, or combination thereof oscillate in size by repeatedly expanding due to lower relative pressure in the constrictions and contracting due to higher relative pressure in the pipe segments while flowing through the serial venturi reactor.

14. The decontamination system of claim 13, wherein the contaminated liquid source comprises a wastewater source, groundwater, water mixed with contaminated soil, or a water tank of a firefighting vehicle.

15. The decontamination system of claim 13, further comprising a treated liquid holding tank connected downstream to the treated stream outlet.

16. The decontamination system of claim 15, further comprising a recycle stream from the treated liquid holding tank to the oscillating bubble reactor or to the contaminated liquid source.

17. A method of decontaminating a contaminated liquid stream, comprising:

forming reactant gas microbubbles of a reactant gas, nanobubbles, or a combination thereof in a contaminated liquid stream, wherein the reactant gas reacts with a contaminant in the contaminated liquid stream;

flowing the contaminated liquid stream and reactant gas microbubbles or nanobubbles through a serial venturi reactor, wherein the serial venturi reactor comprises a set of serially connected constrictions alternating with pipe segments having a larger diameter than a smaller diameter of the constrictions, wherein the constrictions and pipe segments are fluidly connected in series with the constrictions between the pipe segments, such that the reactant gas microbubbles or nanobubbles oscillate in size by repeatedly expanding due to lower relative pressure in the constrictions and contracting due to higher relative pressure in the pipe segments having a larger diameter; and recovering a treated stream from the serial venturi reactor, wherein the treated stream has a reduced concentration of the contaminant.

18. The method of claim 17, wherein the reactant gas is ozone, air, oxygen, hydrogen, methane, carbon monoxide, carbon dioxide, or a combination thereof.

19. The method of claim 17, wherein the contaminated liquid stream is a wastewater stream, a groundwater stream, water mixed with contaminated soil, or water from a water tank of a firefighting vehicle.

20. The method of claim 17, wherein the contaminant is a polyfluoroalkyl substance.

21. The method of claim 17, wherein the contaminated liquid stream flows through the serial venturi reactor at a flow rate that provides a laminar flow regime.

22. The method of claim 17, wherein the reactant gas is added to the contaminated liquid stream at a flow rate from about 10 mL/min to about 5000 mL/min.

* * * * *